(12) United States Patent
Pacheco

(10) Patent No.: US 8,636,521 B2
(45) Date of Patent: Jan. 28, 2014

(54) TEACHING APPARATUS

(76) Inventor: Francisco Pacheco, Heredia (CR)

( * ) Notice: Subject to any disclaimer, the term of this patent is extended or adjusted under 35 U.S.C. 154(b) by 355 days.

(21) Appl. No.: 13/064,747

(22) Filed: Apr. 13, 2011

(65) Prior Publication Data

US 2011/0207106 A1    Aug. 25, 2011

(51) Int. Cl.
*G09B 23/06* (2006.01)

(52) U.S. Cl.
USPC ............................... 434/300; 446/107; 74/25

(58) Field of Classification Search
USPC .................. 434/300; 446/107, 119, 124, 126; 74/25, 61, 333
See application file for complete search history.

(56) References Cited

U.S. PATENT DOCUMENTS

| | | | | |
|---|---|---|---|---|
| 3,269,203 | A * | 8/1966 | Frost ................................ | 74/333 |
| 3,641,797 | A * | 2/1972 | Bell et al. ......................... | 72/160 |
| 3,913,014 | A * | 10/1975 | Halstead et al. ........... | 324/103 R |
| 6,334,368 | B1 * | 1/2002 | Morrow ........................... | 74/410 |
| 6,731,017 | B2 * | 5/2004 | Mikhall et al. ................ | 290/1 C |
| 6,916,263 | B1 * | 7/2005 | Pacheco ......................... | 473/607 |
| 7,077,816 | B2 * | 7/2006 | Tseng .............................. | 601/86 |
| 7,555,882 | B2 * | 7/2009 | Clauss et al. ............... | 56/10.2 G |
| 7,559,821 | B2 * | 7/2009 | Pacheco ......................... | 446/108 |
| 7,935,013 | B2 * | 5/2011 | Pacheco ......................... | 473/604 |
| 8,225,685 | B2 * | 7/2012 | Heichel et al. ..................... | 74/61 |
| 2003/0222456 | A1 * | 12/2003 | Mikhall et al. ................ | 290/1 R |
| 2004/0025815 | A1 * | 2/2004 | Green ....................... | 123/65 BA |
| 2005/0124921 | A1 * | 6/2005 | Tseng .............................. | 601/86 |
| 2006/0234600 | A1 * | 10/2006 | Pacheco ......................... | 446/124 |
| 2009/0082144 | A1 * | 3/2009 | Pacheco ......................... | 473/604 |
| 2011/0207106 | A1 * | 8/2011 | Pacheco ......................... | 434/300 |

FOREIGN PATENT DOCUMENTS

WO    WO 2010043187 A1 *   4/2010 ............. G09B 23/10

* cited by examiner

*Primary Examiner* — Gene Kim
*Assistant Examiner* — Joseph B Baldori
(74) *Attorney, Agent, or Firm* — H. Jay Spiegel

(57) ABSTRACT

An apparatus for teaching concepts concerning equilibrium, symmetry of energy flow and spherical motion including a centrally located octagear with eight engaging bevel gears, each having a central axis at a 70° angle relative to its adjacent gears. Each gear has a central shaft extending outwardly from the octagear, with the shafts having identical lengths. Reciprocating motion delivered to a crank mechanism is translated into rotary motion of the shaft, this rotary motion being transmitted to the gear at the end of the shaft. Connecting the crank mechanisms of each shaft are a plurality of beams with each beam spanning the space between two crank mechanisms. Each beam is capable of flexing between a first curved position and a second curved position resulting in a change in the span length of the beam and generating reciprocatory motion transmitted to the crank mechanisms. A cube-shaped frame is also provided.

15 Claims, 23 Drawing Sheets

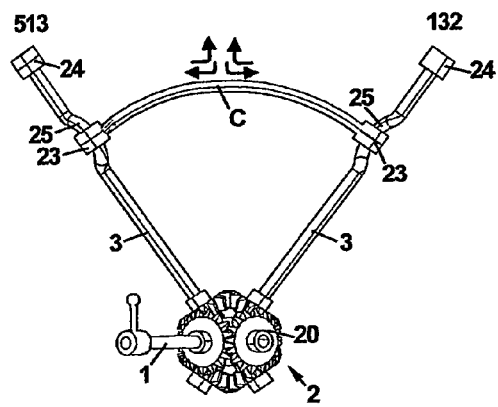
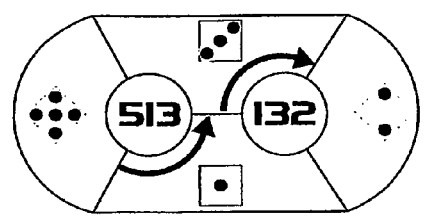
FIG. 19a  FIG. 19b
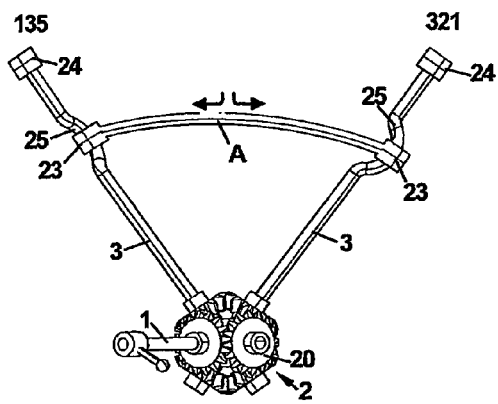
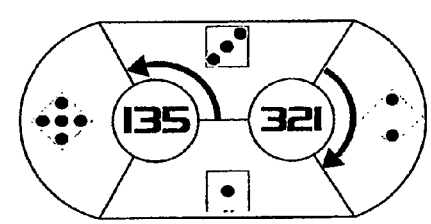
FIG. 20a  FIG. 20b
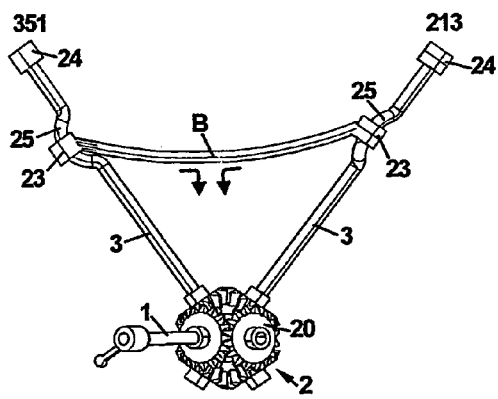
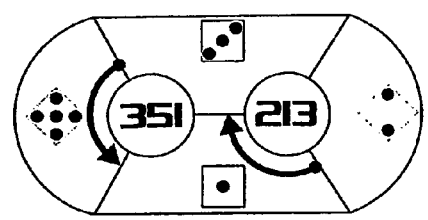
FIG. 21a  FIG. 21b

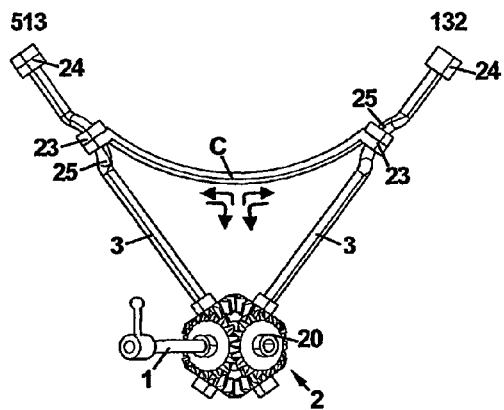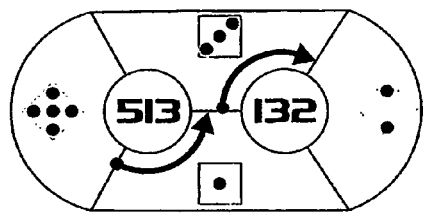
FIG. 22a  FIG. 22b
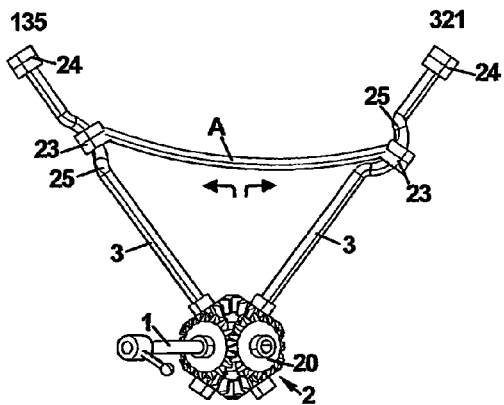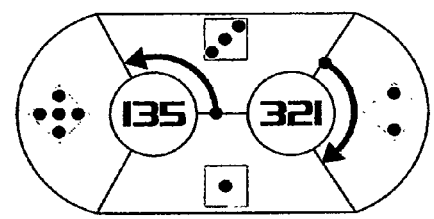
FIG. 23a  FIG. 23b
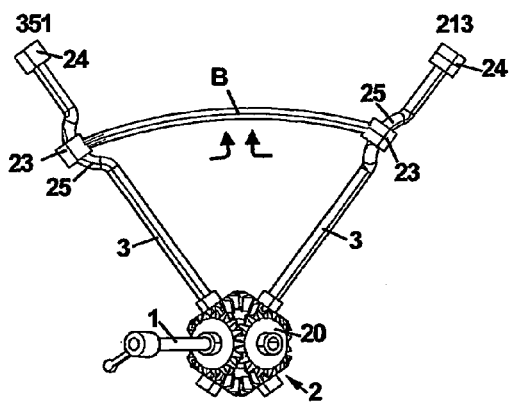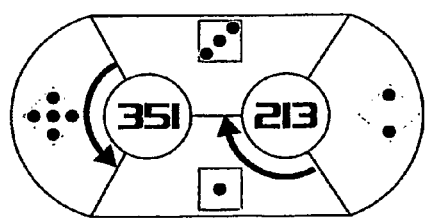
FIG. 24a  FIG. 24b

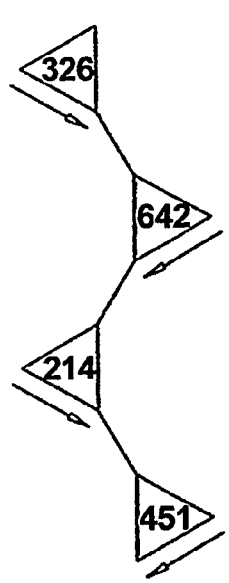 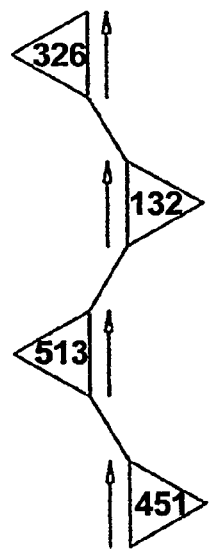 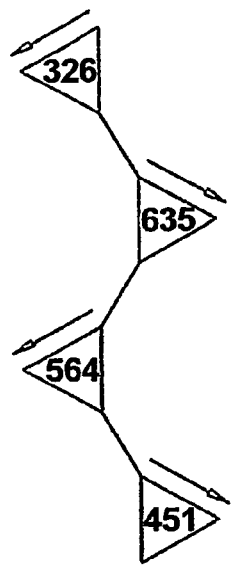
FIG. 25a  FIG. 25b  FIG. 25c
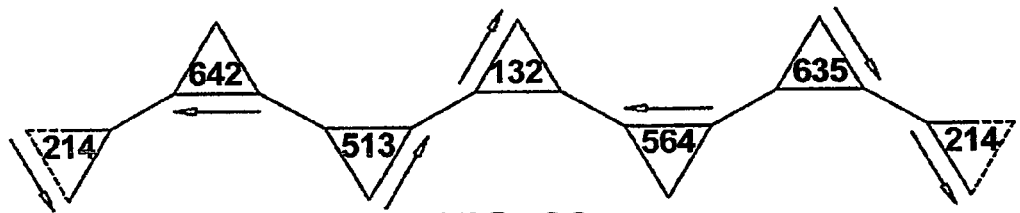
FIG. 26a
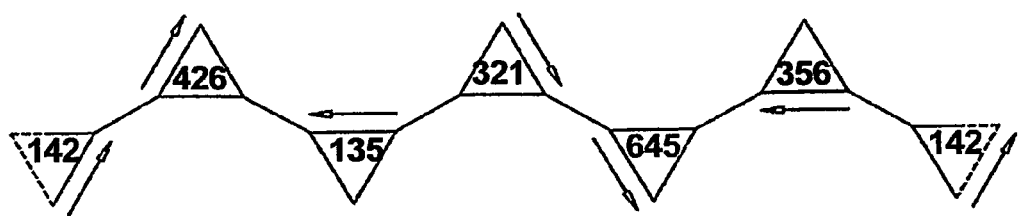
FIG. 26b
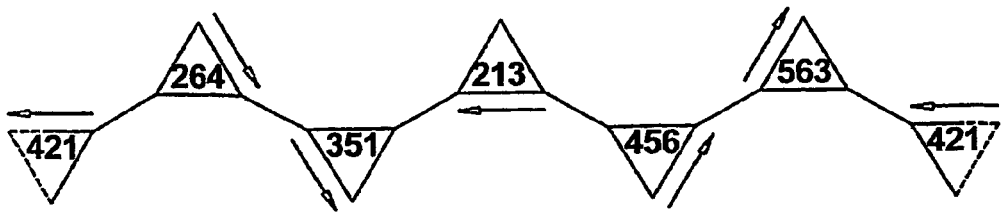
FIG. 26c

C

A

B

TEACHING APPARATUS

FIELD OF THE INVENTION

Fictitious forces are additional forces that appear in rotating reference frames. These forces are difficult to explain. The present invention provides a mechanism far from equilibrium and producing rotation over an axis for demonstrating the function of these forces on spherical bodies. The mechanism explains how random fluctuations of vibrating strings or beams can become coherent when producing these additional pseudo forces.

BACKGROUND

A beam is a structural element that is capable of withstanding load primarily by resisting bending. The bending force induced into the material of the beam as a result of the external loads is called a bending moment.

The magnitude of the bending moment along the length of a beam varies depending on the location and type of supports on which the beam is located. A positive bending moment induces compressive forces above the neutral axis, while tensile forces are induced in the material below the neutral axis. The compressive and tensile forces result in shortening and lengthening of the material respectively above and below the neutral axis. Internally, beams experience compressive, tensile and shear stresses as a result of the loads applied to them By stretching and bending/contracting a resting beam the section between supports of the beam, called span, varies in length. The span is a significant factor in finding the strength and size of a beam as it determines the maximum bending moment and deflection.

There is a mechanical energy required to disassemble a beam or any other object into separate parts that is called binding energy. Binding energy represents the mechanical work which must be done in acting against the forces which hold an object together while disassembling the object into component parts. By stretching and bending a resting beam the binding energy of the beam is affected.

A beam can vibrate or oscillate about an equilibrium point. The oscillations may be periodic or can be random. Damping dissipates the energy and therefore the oscillating beam will eventually come to rest. A mechanical system set off with an initial input vibrates freely at one or more of its natural frequencies and damp down to zero. When an alternating force or motion is applied to a mechanical system the frequency of the vibration is the frequency of the force or motion applied, with order of magnitude being dependent on the actual mechanical system.

A vibration in a string is a wave. Usually a vibrating string produces a sound whose frequency in most cases is constant. Therefore, since frequency characterizes the pitch, the sound produced is a constant note. The provided apparatus consists of a "string vibration mechanism".

SUMMARY OF INVENTION

The theories of equilibrium and the effect of forces such as coriolis and centrifugal forces on equilibrium and the motion of spheres and pseudo forces can be difficult to visualize and understand. Furthermore, because of the physical world in which we live, the effect of friction on such motion also has importance.

We will describe a mechanism that uses the binding energy of a set of bent beams in combination with a selected frequency of vibration, and the input of centrifugal and coriolis forces to induce rotation to a central axle. In a combustion engine the ignition of a fuel and the resulting expanding gas in the cylinder transfers force to the crankshaft via the piston and connecting rod, to convert reciprocating motion into rotating motion. Our mechanism utilizes the energy from a set of twelve bent or contracted beams or rods substantially corresponding to the edges of a cube with each end of three groups of beams connecting to crank means corresponding to the corners of the cube, so that when they stretch to augment their span, they experience a reciprocating movement that is transferred to rotating motion through the set of crank means attached to eight shafts synchronized by an octagear, with this octagear acting as the crankshaft in an engine, imparting rotation to a selected central axle.

It is therefore an object of the present invention to provide a mechanism for demonstrating the theories of equilibrium on spherical motion.

It is a further object to provide a mechanism for teaching the symmetrical flow of energy around a spherical body in the form of motion of a center of mass.

It is a still further object to provide a mechanism to explain the function of coriolis and centrifugal forces on a rotating mass.

It is an even further object to provide a mechanism to explain the axis of rotation of a spherical body.

Further objects and advantages will become evident by reference to the following description and drawings.

The present invention provides an apparatus for teaching various concepts related to equilibrium, symmetry of energy flow and spherical motion and comprises a mechanism having a centrally located octagear made up of eight engaging bevel gears each having a central axis that is at a 70° angle relative to it's adjacent gears. Each gear has a shaft extending centrally therefrom and outward away from the octagear, with each shaft being identical in length. Toward the end of each shaft is a crank mechanism whereby reciprocating motion delivered to the crank mechanism is translated into rotary motion of the shaft about its longitudinal axis, this rotary motion being transmitted to the gear at the end of the shaft. Connecting the crank mechanisms of each shaft are a plurality of beams with each beam spanning the space between two crank mechanisms. Each beam is capable of flexing between a first curved position and a second curved position effectively resulting in a change in the span length of the beam and thereby generating a reciprocatory motion which is transmitted to the crank mechanisms.

Within the mechanism is a cube shaped frame (or any form that keeps the gears aligned with the spacediagonals of a cube) with the corners of the cube corresponding to each of the eight shafts extending from the octagear. Each shaft extends through a corner of the cube which is provided with a bearing means to permit the shaft to freely rotate therein. The cube frame is preferably located toward the outer ends of the shafts and provides support and rigidity to the mechanism.

In a first embodiment of the apparatus the beams are capable of vibrating between a first curvature of a short radius and a second curvature of a long radius without passing through a straight-line position. In this embodiment, the beams connect crank mechanisms at the outer ends of the shafts outside of the cube frame. In a second embodiment, the beams vibrate between a first curvature having an outer short radius and a second curvature having an inner short radius and passing through a straight-line position. In this embodiment, the beams connect crank mechanisms located inward of the

3 outer ends of the shafts and the cube frame connects the outer ends of the shafts such that the vibrating beams are located within the cube confines.

4

Figure 12B:
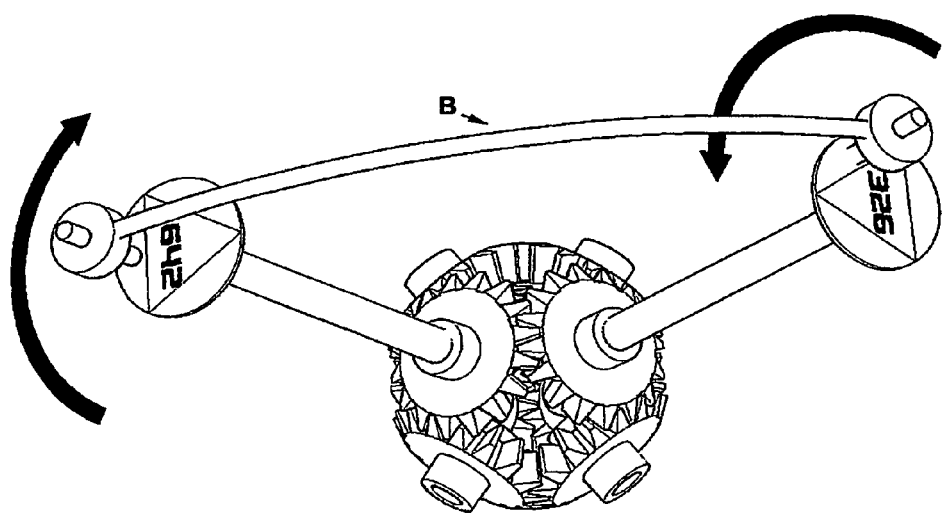
FIG. 12b illustrates a selected beam of the four contracting beams with the involved shafts attached to the octagear. The arrows show the trajectory of the rotation of the shafts that goes from the end of the stretching cycle to the beginning of the neutral cycle.
Figure 12A:
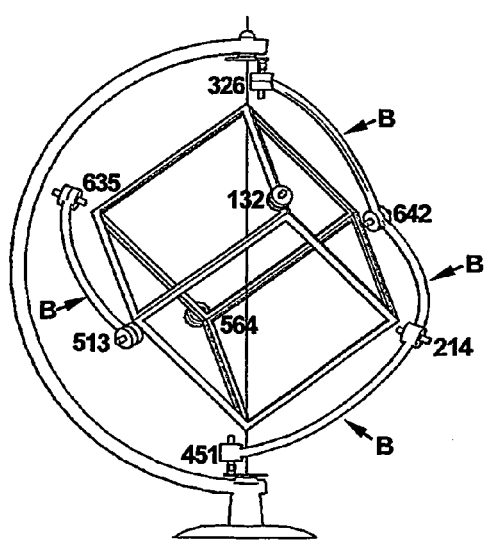
FIG. 12a illustrates a set of four beams with the same loads describing the contracting moment of a spin cycle.
Figure 12C:
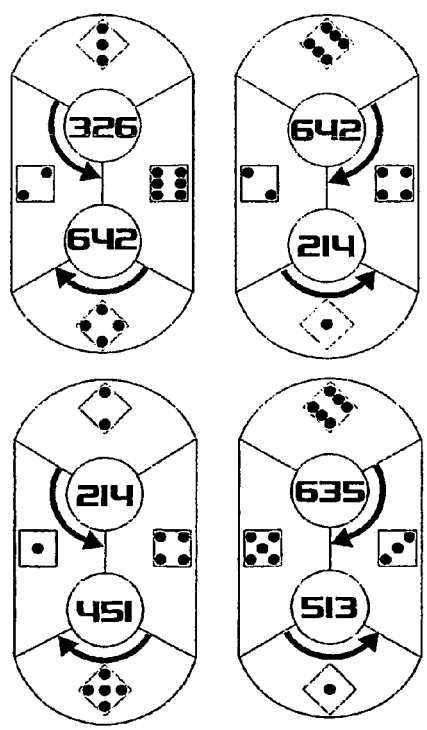

FIG. 12c explains in a two dimensional scheme the three dimensional action and positioning described in FIGS. 12a and 12b. The first scheme of the row is represented in FIG. 12b.

Figure 13B:
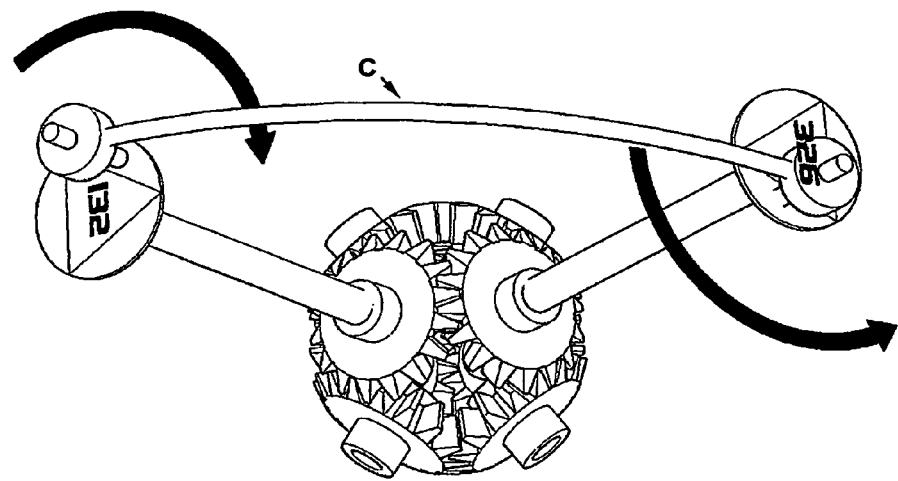
Figure 13A:
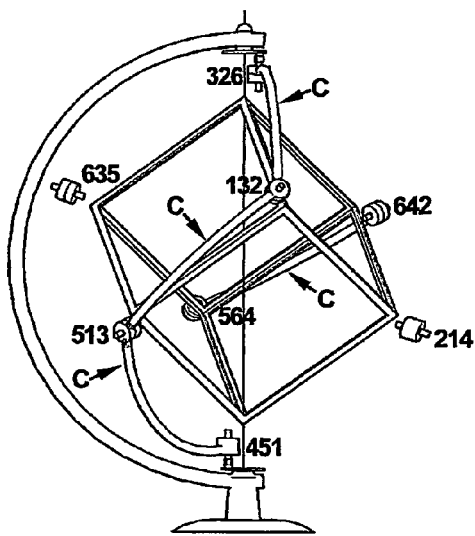

FIG. 13a illustrates a set of four beams with the same loads describing the neutral moment of a spin cycle.

FIG. 13b illustrates a selected beam of the four neutral beams with the involved shafts attached to the octagear. The arrows show the trajectory of the rotation of the shafts that goes from the end of the contracting cycle to the beginning of the stretching cycle.

Figure 13C:
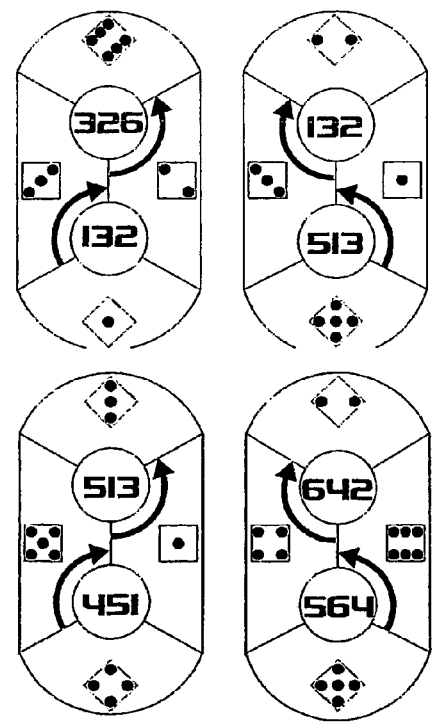

FIG. 13c explains in a two dimensional scheme the three dimensional action and positioning described in FIGS. 13a and 13b. The first scheme of the row is represented in FIG. 13b.

Figure 10A:
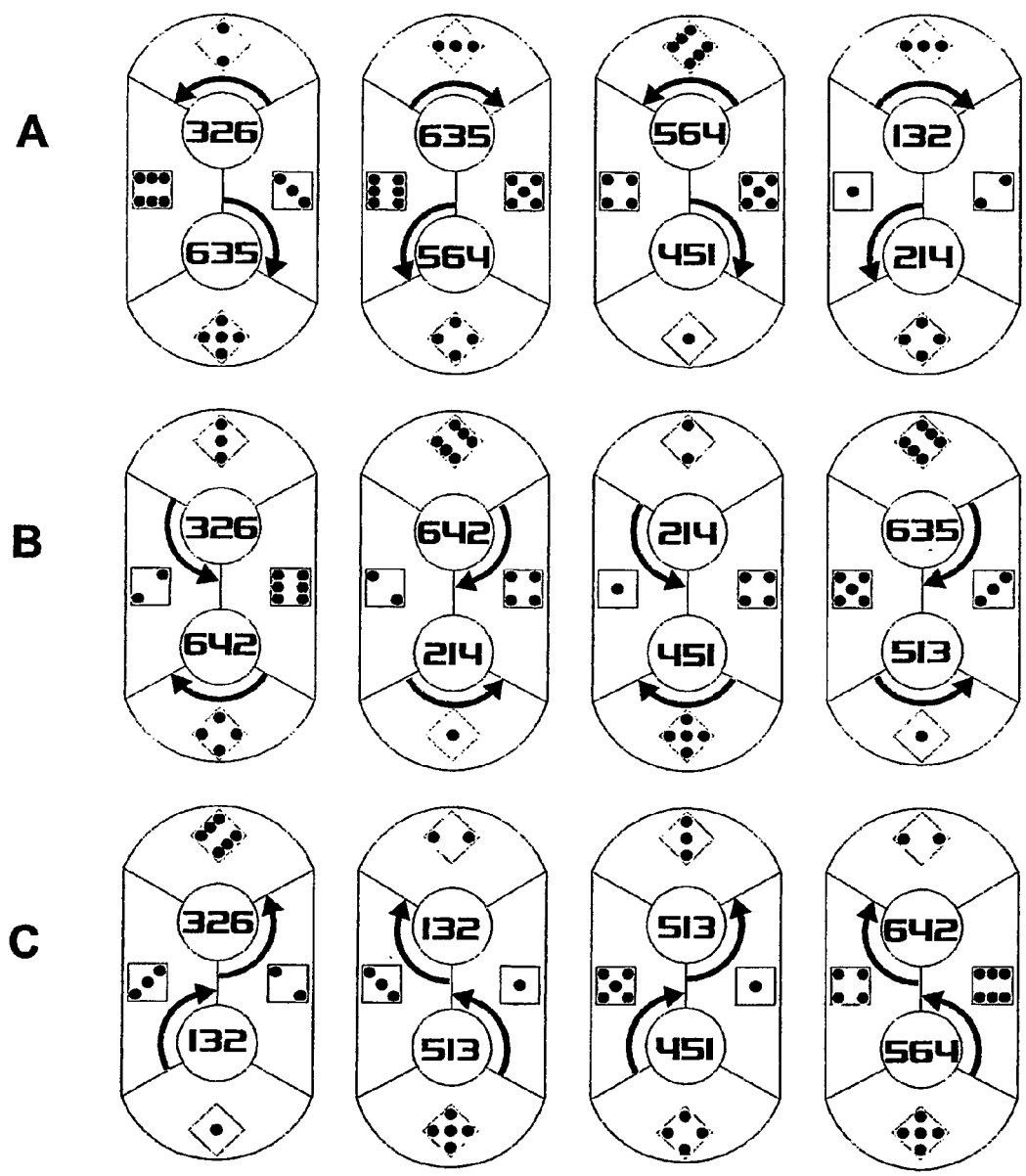
FIG. 10a illustrates the position and direction of the twelve beams describing moment #1 of the cycle.
Figure 14A:
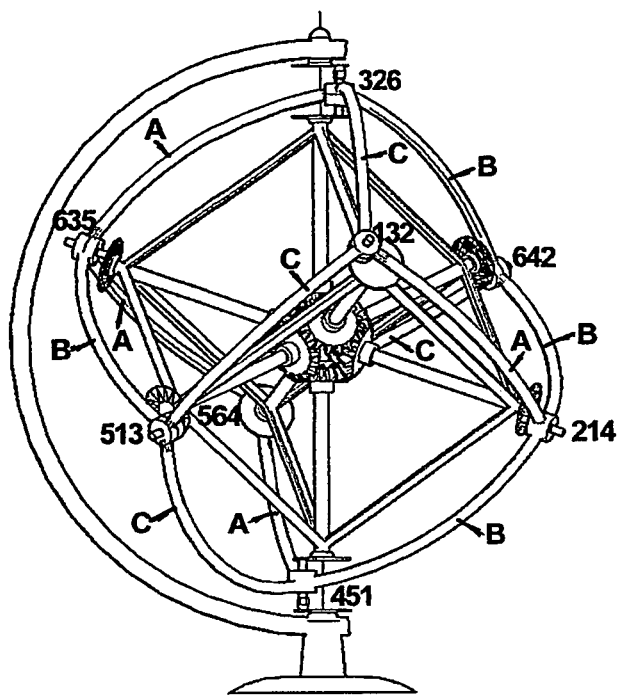

FIGS. 14a and b illustrate a front view and a corresponding top view of moment #1 of the cycle according to FIG. 10a.

Figure 10B:
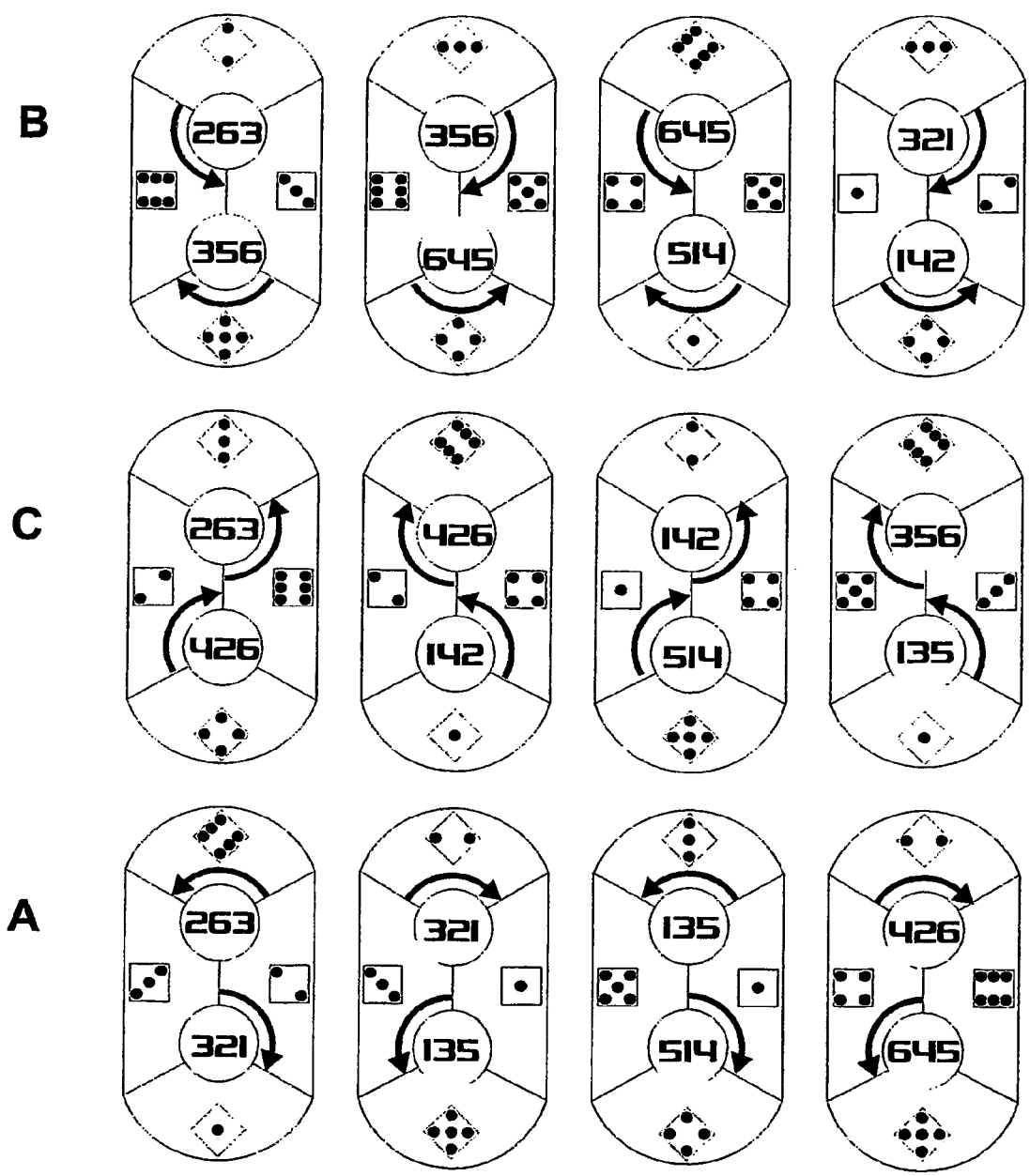
FIG. 10b illustrates the position and direction of the twelve beams describing moment #2 of the cycle.
Figure 15A:
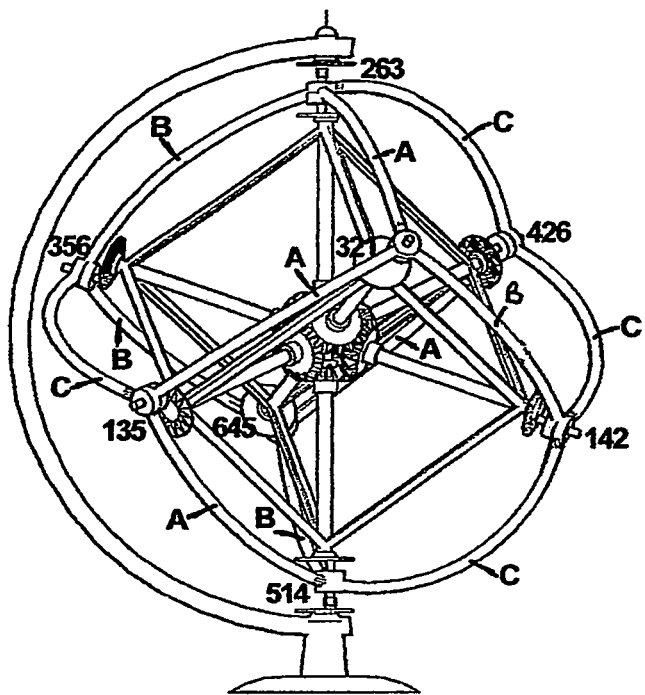

FIGS. 15a and b illustrate a front view and a corresponding top view of moment #2 of the cycle according to FIG. 10b.

Figure 10C:
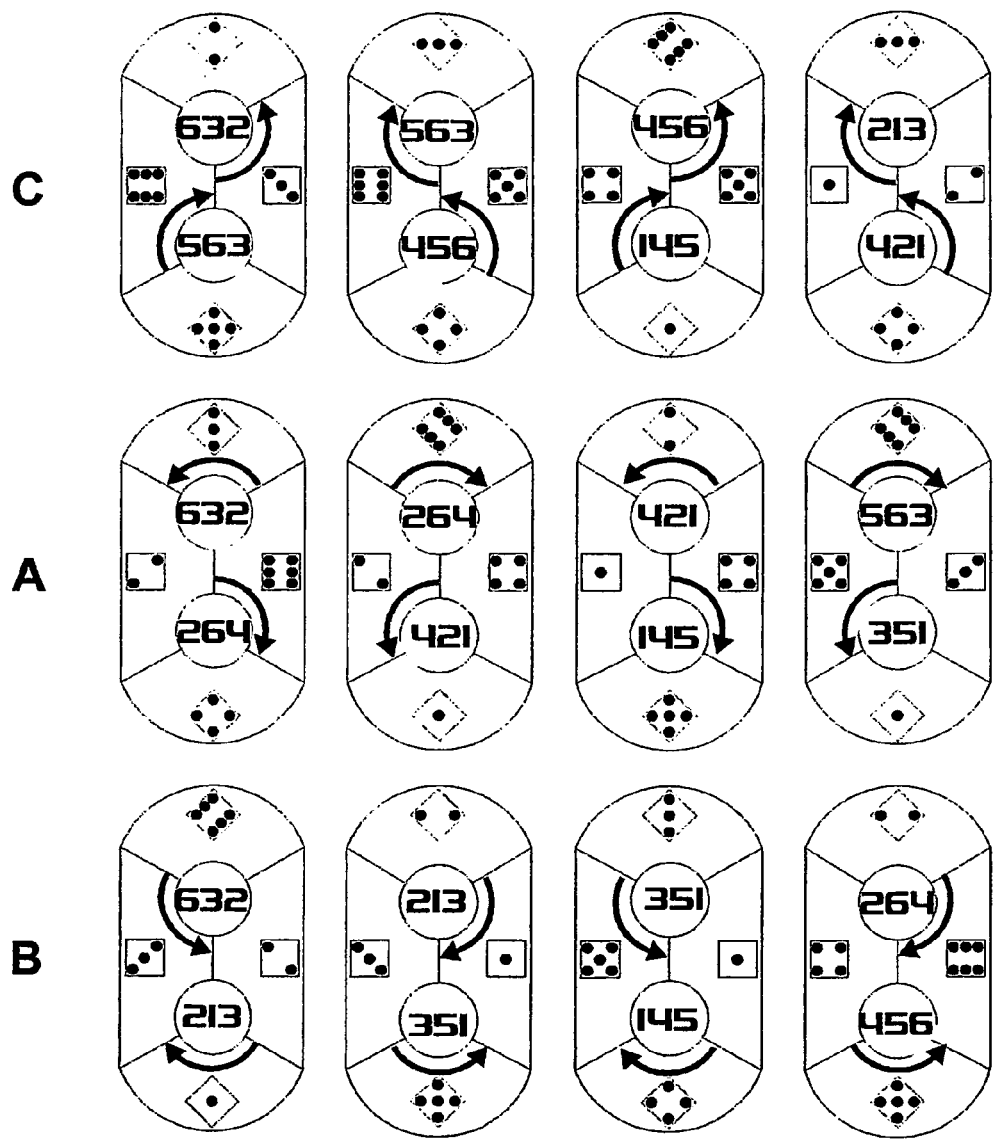
FIG. 10c illustrates the position and direction of the twelve beams describing moment #3 of the cycle.
Figure 16A:
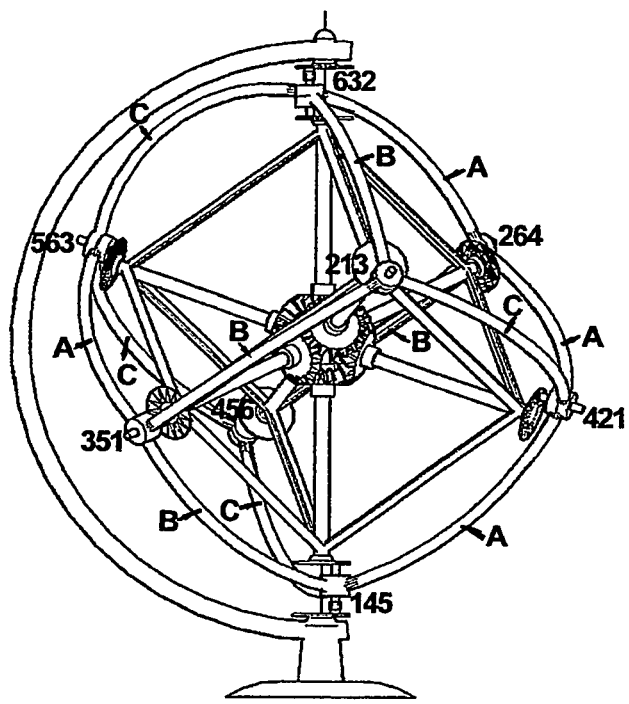

FIGS. 16a and b illustrate a front view and a corresponding top view of moment #3 of the cycle according to FIG. 10c.

Figure 17:
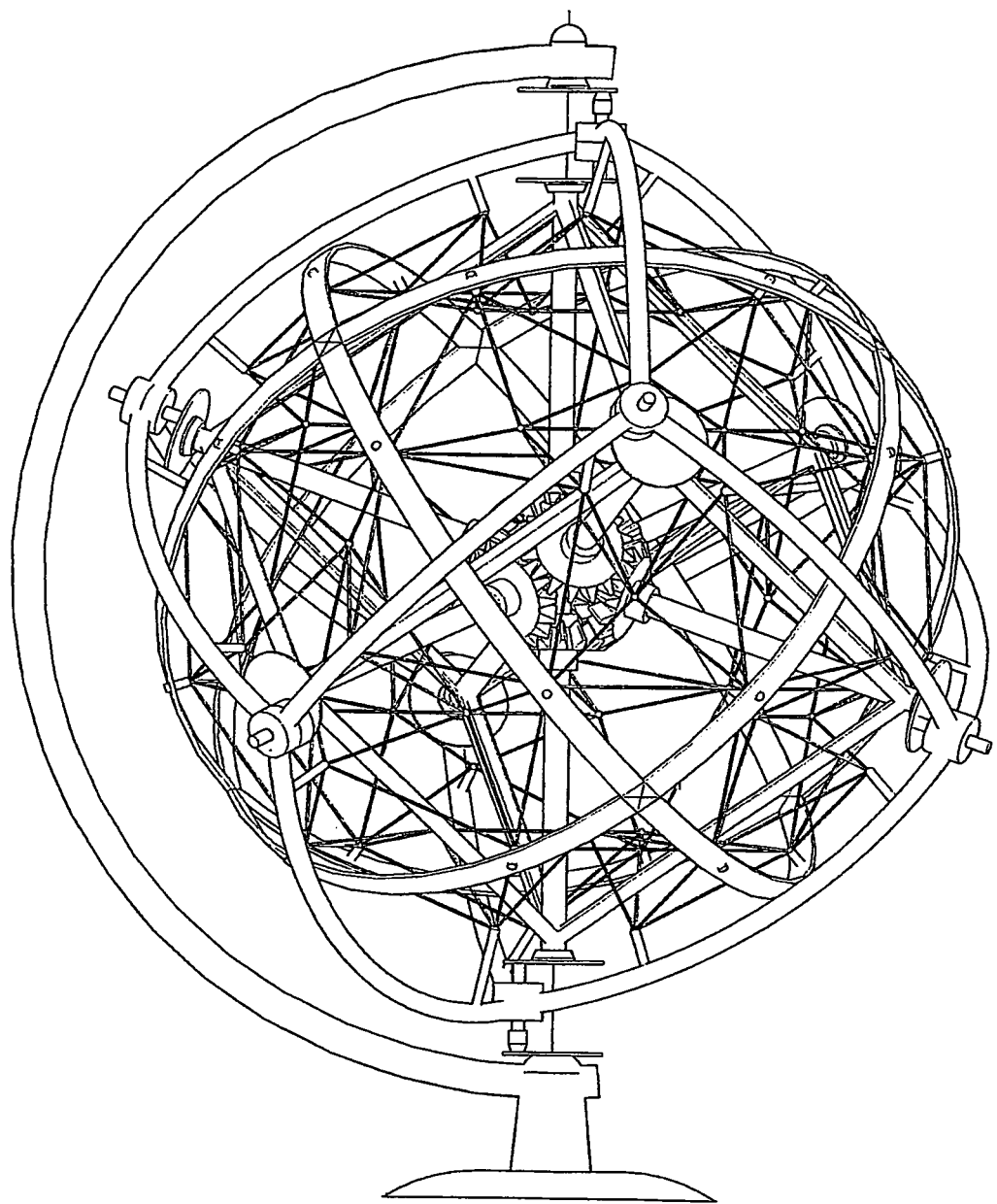

FIG. 17 illustrates the described mechanism with additional supports as selected in an embodiment to be used as a teaching aid.

Figure 18:
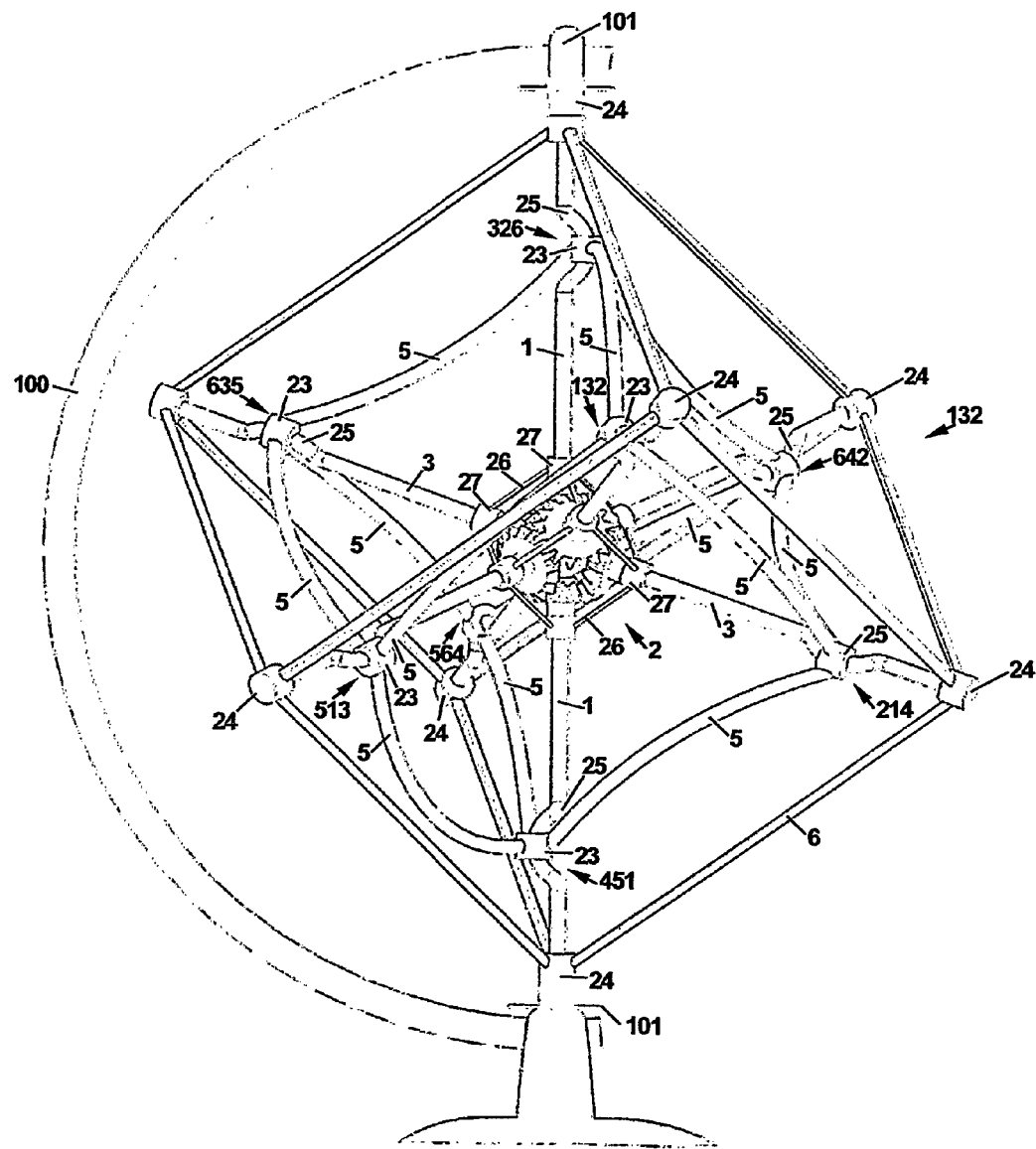

FIG. 18 illustrates a second embodiment of the present invention.

FIGS. 19a and b illustrate a first moment of a six stroke cycle of a device according to the second embodiment.

FIGS. 20a and b illustrate a second moment of a six stroke cycle of a device according to the second embodiment.

FIGS. 21a and b illustrate a third moment of a six stroke cycle of a device according to the second embodiment.

FIGS. 22a and b illustrate a fourth moment of a six stroke cycle of a device according to the second embodiment.

FIGS. 23a and b illustrate a fifth moment of a six stroke cycle of a device according to the second embodiment.

FIGS. 24a and b illustrate a sixth moment of a six stroke cycle of a device according to the second embodiment.

FIGS. 25a, b and c schematically illustrate the three sets of beams and their respective crankshafts in contracting, neutral and stretching moments.

FIGS. 26a, b and c schematically illustrate equatorial beam groups corresponding to three moments of the six stroke cycle of the second embodiment.

FIGS. 27a-f illustrate the six moments of a cycle of the second embodiment when viewed from above.

Figure 28:
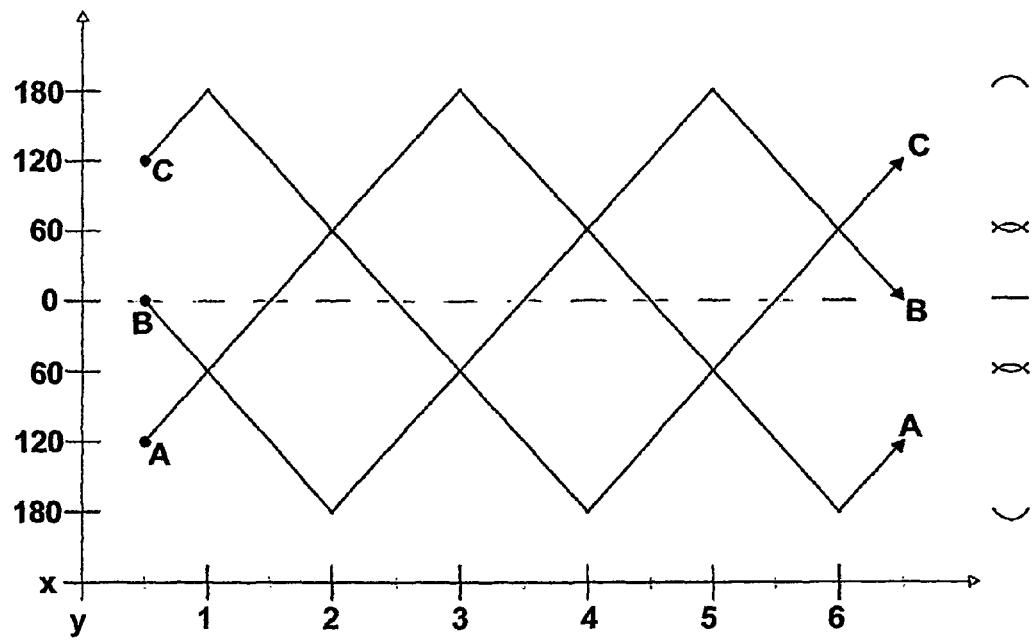
Figure 29:
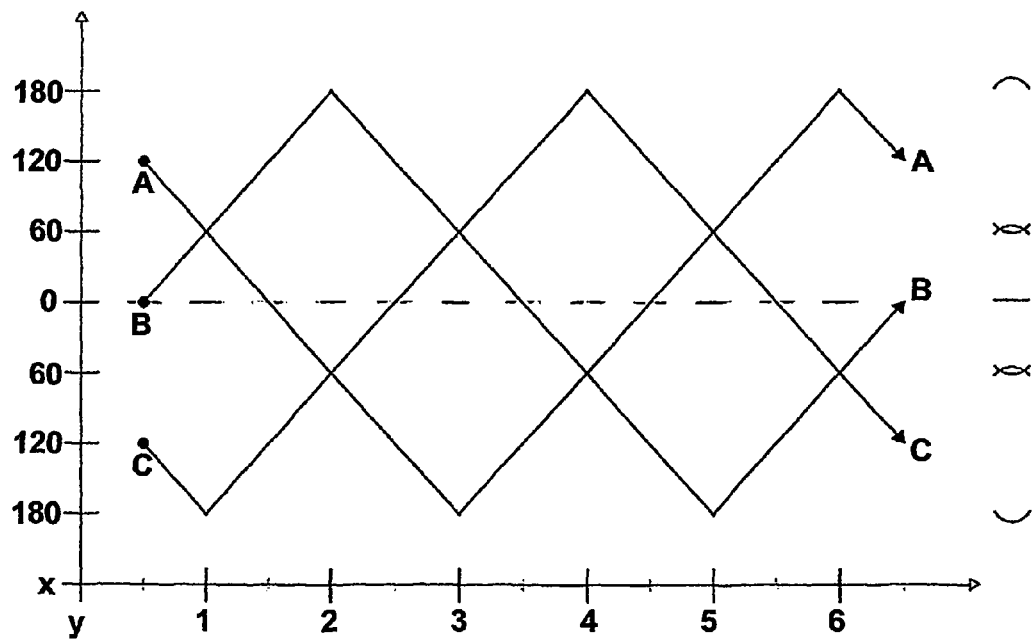

FIGS. 28 and 29 are graphical representations of the load forces on the beams during a six stroke cycle of the mechanism.

Figures 30A, 30B, 30C, 30D:
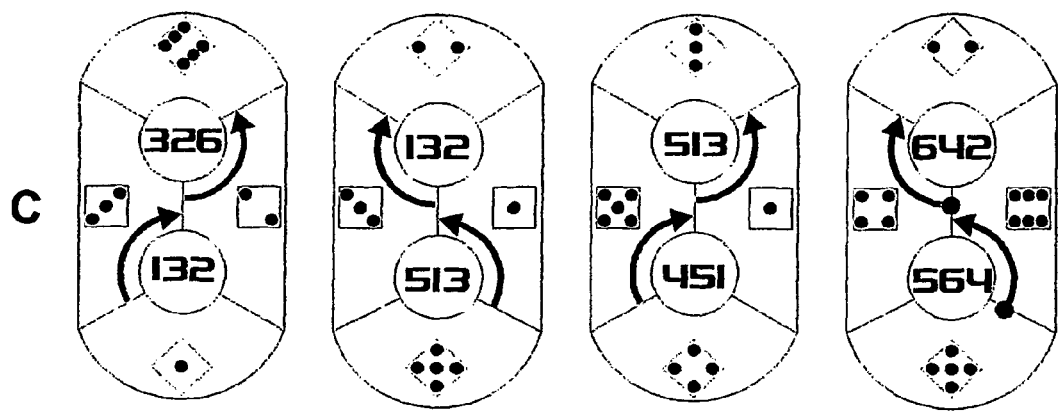
Figures 31A, 31B, 31C, 31D:
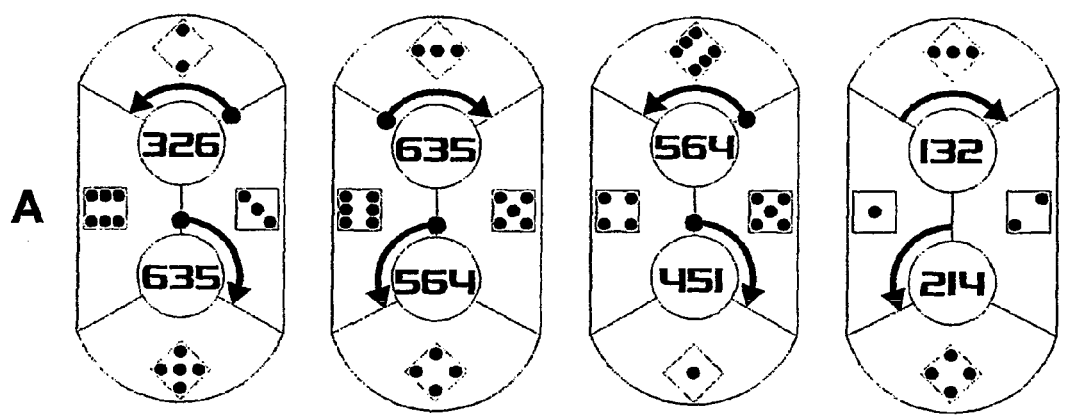
Figures 32A, 32B, 32C, 32D:
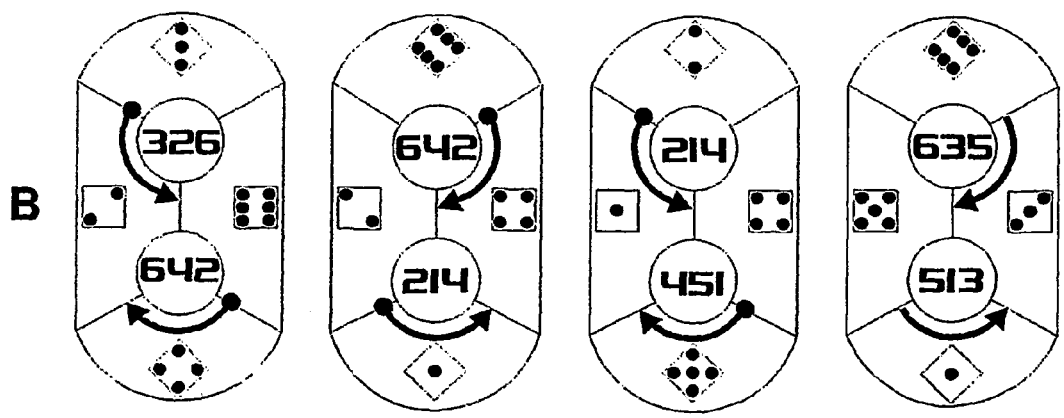

FIGS. 30-32 illustrate in two dimensions the three dimensional rotation of the shafts and axle of the second embodiment in the first of six strokes.

DESCRIPTION

Figure 1:
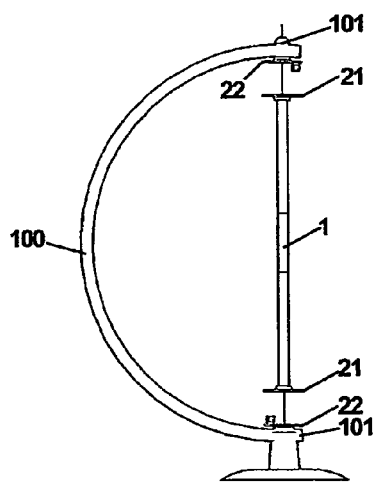
FIG. 1 illustrates a first rotational axle perpendicular to the ground.
Figure 2:
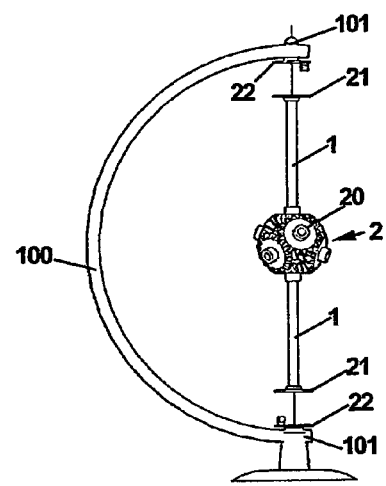
FIG. 2 illustrates the positioning of the octagear in the middle of the first rotational axis.
Figure 4:
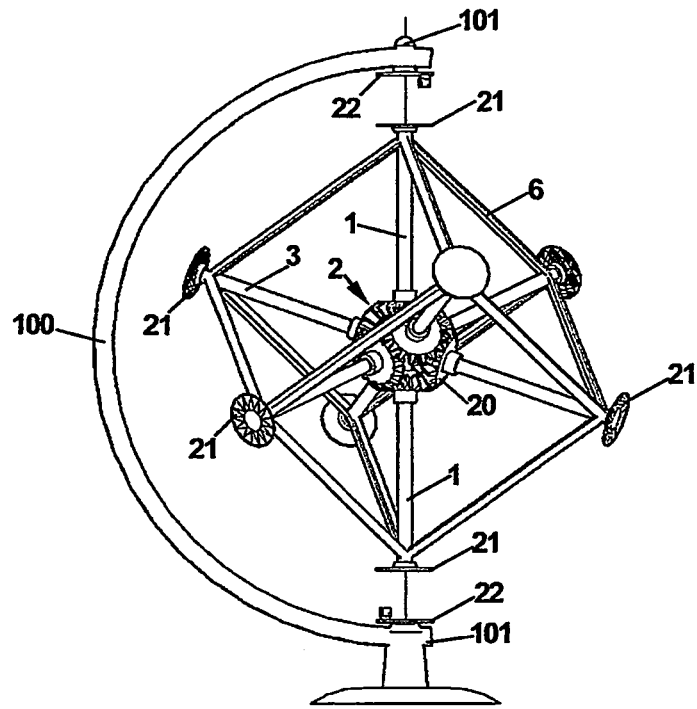
FIG. 4 illustrates a frame which keeps the outermost ends of the shafts aligned with the rotational axes of the octagear.

In a support frame 100 we define a selected rotational axis through axle (1), see FIG. 1, and we place an octagear (2), see FIG. 2, in the middle so that two of its opposed bevel gears (20) are attached to the axle (1) which extends through octagear (2), the ends of axle (1) being rotationally connected to support frame 100 in a manner to be described. The octagear (2) consists of eight bevel gears (20), each gear engaging three neighbor gears, where the central axes of rotation of neighbor gears intersect and work at about 70 degree angles. The octagear (2) provides four pairs of opposed gears, each pair aligned with a different space diagonal of a cube. When the set of eight bevel gears (20) works together in a synchronized manner, four of the gears run in one direction and the other four run in the opposite direction. Provided that a cube consists of two inscribed tetrahedrons, whereby one tetrahedron's base coincides with four corners of the cube and the second tetrahedron's base coincides with the other four corners of the cube, the position of the bevel gears (20) rotating in one direction coincide with the apex of the first tetrahedron and the gears (20) revolving in the other direction coincide with the apex of the second tetrahedron. This arrangement is shown in FIG. 4.

Figure 3:
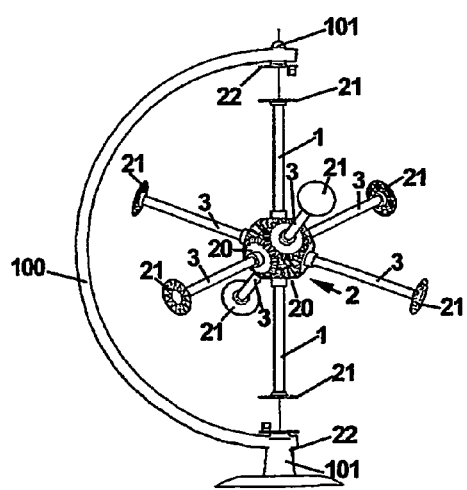
FIG. 3 illustrates the octagear with eight shafts extending outwardly from corresponding bevel gears of the octagear with each shaft having a leverarm in the form of a plate at the outermost end thereof.

In addition to axle (1) which passes through two opposing bevel gears (20) and is substantially perpendicular to the ground, six outward extending shafts (3) are attached to the remaining bevel gears (20) of the octagear (2), see FIG. 3. These six shafts (3) have an angle of about 70 degrees relative to axle (1) which is perpendicular to the ground and extends and connects together to the inner part of the octagear (2), thereby defining the selected rotational axis of the mechanism.

Alternatively, for teaching purposes, axle (1) may be other than perpendicular to the ground. For example it may be given an angle of 23° similar to the axis of the Earth. In addition, axle (1) may comprise two separate shafts (3) rather than a single shaft extending through the octagear (2) in which case the bevel gears (2) may be supported and rotate on a central member such as a sphere.

Figure 5:
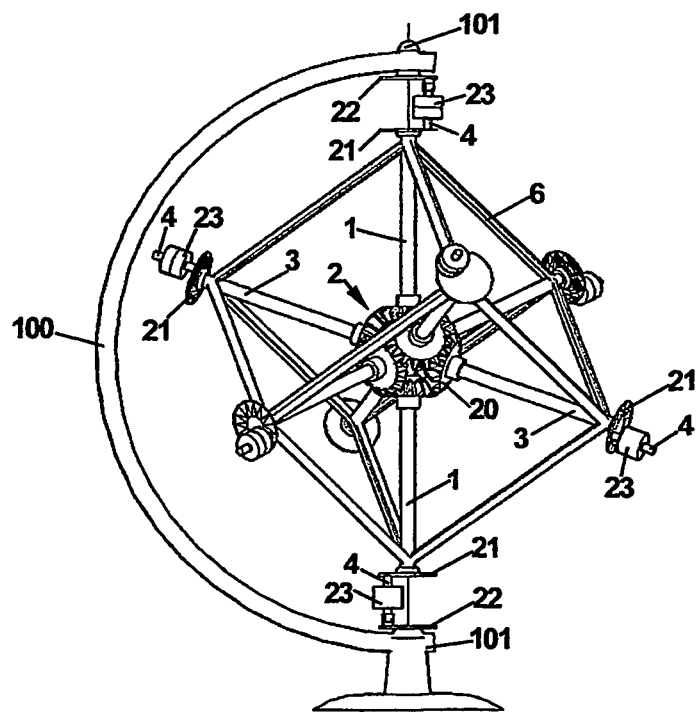
FIG. 5 illustrates the placement of offset crankpins located at the leverarms of the shafts.

At the external end of each of the shafts (3) and axle (1) are provided crankpins (4) offset relative to the axes of the shafts (3) and axle (1) to impart motion to the shafts (3) and axle (1) when a particular force is acting on them. The crankpins (4) may be attached to the shafts (3) and axle (1) by lateral arms extending at right angles to the shafts (3) and axle (1). Preferably axle (1) and each shaft (3) is provided with a plate (21) at their free ends with the plane of plate (21) being perpendicular to the longitudinal axis of its respective shaft (3) or axle (1). Crankpins (4) are keyed to plates (21) as shown in FIG. 5 and the crankpins (4) of axle (1) are, in turn, keyed to corresponding plates (22) attached to rotational mounts (101) on frame (100) to permit transfer of the energy output to do work in the outer part of the mechanism. Alternatively, mounts (101) may be fixed, in which case all energy will be transferred into rotation of the mechanism within the support frame (100).

The crankpins (4) are bearing surfaces whose axis is offset from that of the shaft and to which the ends of the beams (5) are attached. When the beams stretch and contract in a reciprocating manner, the crankpins (4) translate that reciprocating motion into rotation, applying torque to the shafts (3). Since each one of the shafts (3) is attached to a bevel gear (20) of the octagear (2), that rotational motion is transferred by the action of those gears (20) to the central axle (1) to be used as energy output or as rotation of the mechanism.

In order to permit rotation of the crankpins (4) in response to the reciprocation of the beams (5), the ends of the beams (5) are attached to a ring or bushing (23) that goes around the crankpins (4). Since the ends of the beams (5) push outward at the rings (23), bearings or similar means should provide the connection between the ring (23) and the crankpin (4) allowing for the beams (5) to turn the shafts (3). In addition, the attachment of the beams (5) to the ring or bushing (23) is preferably by a means which will accommodate the inherent reciprocating and rotational motion which occurs at the ends of the beams as they move through their cycle of operation. Such means may include ball and socket or other suitable universal-type joints. The crankpins (4) are fixed onto the end of the crankarm or plate (21) and three beams (5) rest and are attached to each of the rings (23) around the crankpins (4) in such a way that the ring (23) is free to rotate on bearings with respect to the crankpin (4) but is attached to it. The bearing surface between the rings (23) and the crankpins (4) may be any structure suitable including, but not limited to, ball bearing or roller bearing assemblies, low friction materials such as nylon or ceramic bushings, or the like. The beams (5) resist bending by stretching and thereby pushing the crankpins (4) to propel the shafts (3). The shafts (3) experience stress from the reciprocating load represented by the stretching and bending beams (5), coming from three different directions due to the three different beam ends attached to the rings (23) at each of the crankpins (4). As the shafts (3) undergo sideways load from the beams (5), they must be supported by a rigid frame (6) which is preferably in the form of a cube, the corners of that cube providing eight bearings (24) adjacent to and inward of the plates (21) through which the shafts (3) and axle (1) pass. The axes of the beatings (24) are aligned with the rotational axes of the shafts (3) and axle (1), allowing the shafts (3) and axle (1) to rotate freely while being attached to the frame (6) keeping said shafts (3) and axle (1) aligned with the rotational axes of their corresponding bevel gears (20) of octagear (2) as shown in FIGS. 4-7. As with the rings (23) on the crankpins (4), the bearings (24) of the frame (6) may be any structure suitable including, but not limited to, ball bearing or roller bearing assemblies, low friction materials such as nylon or ceramic bushings, or the like, even a plain hole and grease may work.

Figure 9B:
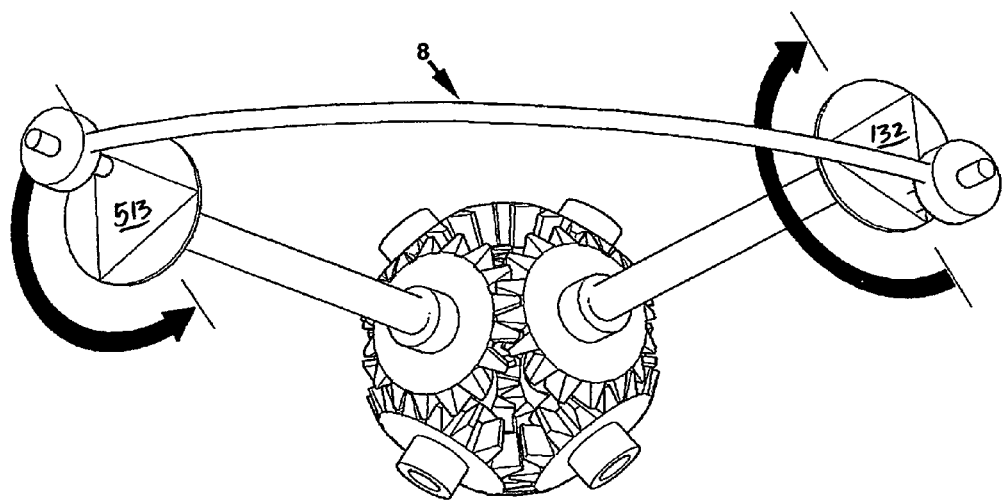
FIG. 9b illustrates the beam of FIG. 9a with the involved shafts attached to the octagear. The arrows show the trajectory of the rotation of the shafts to reach the short span position of FIG. 8b.

The magnitude of the rotational force applied to the shafts (3) by the reciprocating force of the stretching and contracting beams (5) varies depending on the moment of force that the beam (5) experiences through any given cycle. The span of the arched beam (5) is the longest when the beam (5) stretches. The resisting bending force of the stretching beam (5) is doing the mechanical work, by applying torque to the shafts (3) via the leverarms or plates (21) at the crankpins (4). The selected material of the beam (5), the selected bending angle of the beam (5) and the distance from the crankpin (4) axis to the shaft (3) axis determines the magnitude of the torque. FIG. 9*b*, shows the stretched position of a beam (5). In order for the mechanism to work the beam (5) needs to show at least a minimal radius of curvature in stretched position, otherwise if the beam (5) adopts a straight-line in stretched position the mechanism locks down, although in a second embodiment of the present invention we will see how the beams (5) may pass through a straightline stretched position from an outer contracted position to an inner contracted position producing rotation of the device in a six moment cycle.

Figure 8B:
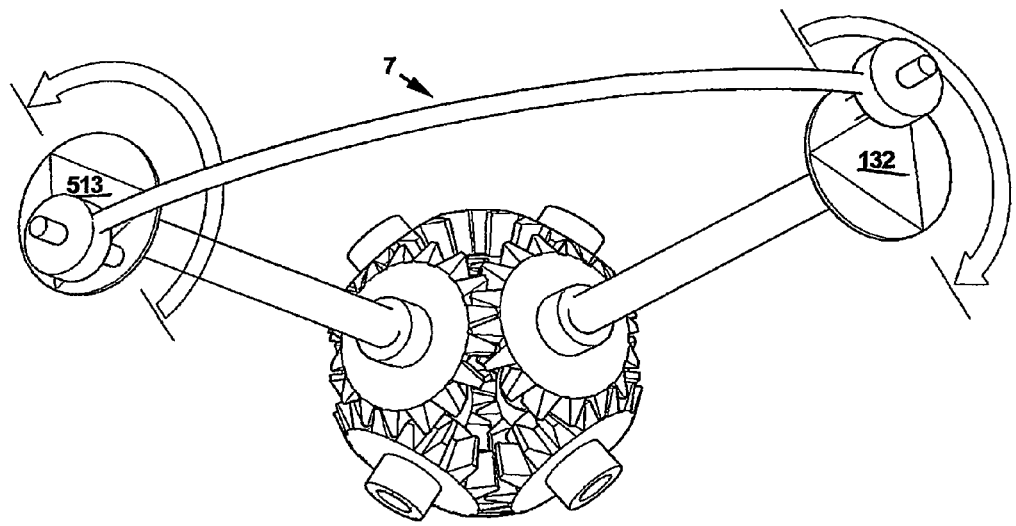
FIG. 8b illustrates the beam of FIG. 8a with the involved shafts attached to the octagear. The arrows show the trajectory of the rotation of the shafts to reach the long span position.

The span of the arched beam (5) is the shortest when the beam contracts. FIG. 8*b*, shows the contracted position (7) of a beam (5) which causes the corresponding crankpins (4) to which the beam (5) is attached to rotate around to their closest relative position. A contracted beam position (7), FIG. 8 *a,b,c*, adopts a smaller radius of curvature than a stretched beam position (8), FIG. 9 *a, b, c*. Motion is imparted to the mechanism when a force is acting on the crankpins (4) to rotate the shafts (3). But the function can also be reversed when the force is transferred from the rotational motion of the shafts (3) to the beams (5), resulting in a contraction of the beam (5). This is the case when the beams (5) go from stretched position (8) to contracted position (7). The trajectory of the crankpins (4) in this case is represented by the arrows in FIG. 9*c*. We will see below that this type of reversed function occurs when the combined loads of four stretching beams is level with the loads of four contracting beams, while the other four beams remain in neutral position. The combination of loads is possible due to the central octagear (2) synchronizing all of the eight shafts (1, 3) of the device.

Figure 8A:
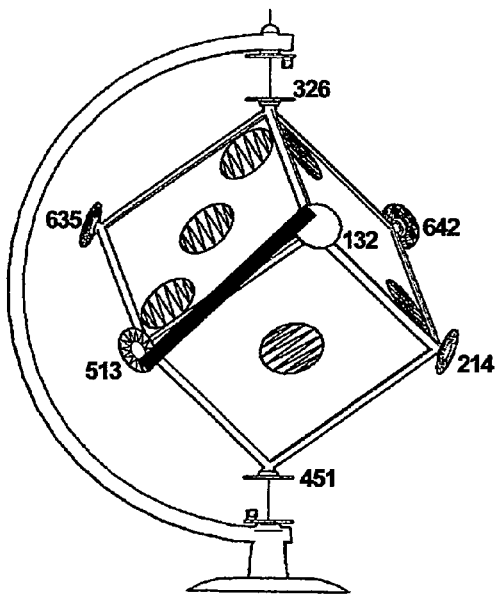
FIG. 8a illustrates a selected beam to describe the short span position of a beam.
Figure 9A:
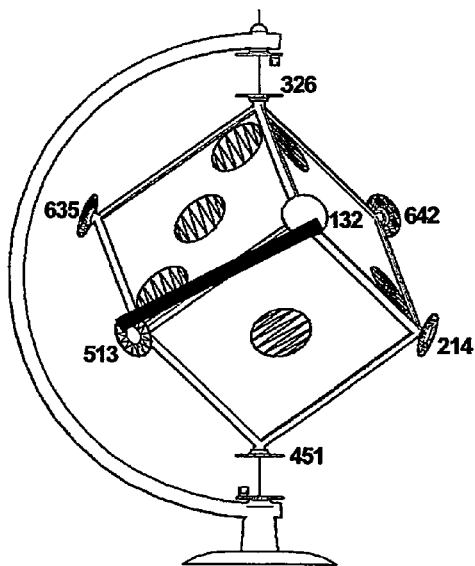
FIG. 9a illustrates a selected beam to describe the long span position of a beam.
Figure 9C:
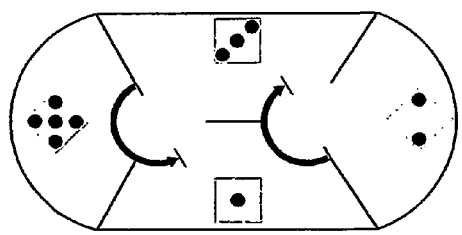
FIG. 9c explains in a two dimensional scheme the three dimensional action and positioning described in 9a and 9b.

The initial position or the orientation of the crankpins (4) with respect to the rest of the pins defines the bending moments and corresponding loads of each beam (5) and thereby determines the ability of the mechanism to do work when the twelve preloaded bent beams (5) are let loose in the mechanism to apply torque to the leverarms. See FIG. 6. We describe these initial positions based on the positioning of the numbers of game dice. FIGS. 8a and 9a show a die inside the cubic frame (6) with numbers 1, 2 and 3 exposed. The positioning of the numbers 4, 5 and 6 can be determined by the rule stating that opposing faces of a die must sum 7. By selecting the initial position of the die with the numbers 3, 2 and 6 in the upper hemisphere and the numbers 1, 4 and 5 in the southern hemisphere we can define a three digit number for each of the corners of the cube (6) and thereby we can easily find a coordinate for each of the crankpins (4). For example, the number 132 describes the vertices of the cube where numbers 1, 3 and 2 meet, but this number also describes the spinning direction of this particular pin coming from face 1 of the cube and rotating in direction 3 and then 2. With this same logic in mind we can deduce that in the same FIGS. 13b and 13c the crankpin at 513 is rotating in the opposite direction first 5, then 1 and then 3. Opposed extremes of beams rotate in opposed directions, to allow proper rotation of the octagear (2). If we imagine the cube in FIGS. 8a and 9a is a terrestrial globe, by convention, just by looking at the numbers of the selected beam 132-513, we should be able to determine that pin 132 is turning West/East/South and pin 513 is turning in opposite direction West/North/East.

Following the same example of FIG. 9a, the selected beam 132-513 extends along side 13 of the cube, the side number being determined by the union of faces 1 and 3 of the imaginary die. The arrows in the scheme of FIG. 9c, describe pin 132 starting at side 21 and rotating until reaching mid side 3 of the die. Accordingly pin 513 starts at side 35 and ends its trajectory in mid side 1. As a visual guide, the vertices of the triangles in FIG. 9b correspond to the lines that divide one die number from the other in the scheme of FIG. 9c. The trajectory from a pin position at the longest span, corresponding to stretched position (8) (FIG. 9) to a pin position at the shortest span, corresponding to a contracted position (7) (FIG. 8), describes the reciprocating movement of the beams (5) based on two opposed and extreme positions: stretched and contracted.

Figure 8C:
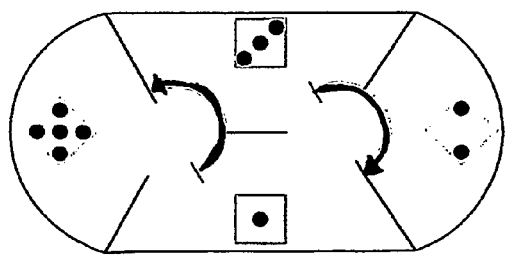
FIG. 8c explains in a two dimensional scheme the three dimensional action and positioning described in FIGS. 8a and 8b.

It is important to point out that the pin positions of FIGS. 8 and 9 are very different from the ones we will describe next, referring to the three different stroke moments described in FIGS. 10, 11, 12 and 13. This difference is due to the fact that although the reciprocating movement has two extreme positions (long (8) and short (7)), the stroke cycle for each revolution of the pin has three different moments corresponding to the loads carried from three different beams (5) at a particular point in time by each pin.

Every degree of rotation on a given pin puts the octagear (2) in motion and with every little rotation of the pins the configuration of the loads of the beams (5) is altered. We will see how the symmetry of the mechanism allows one to understand the functioning of the entire cycle of the beams (5) by analyzing only one third of the rotation.

Figure 6:
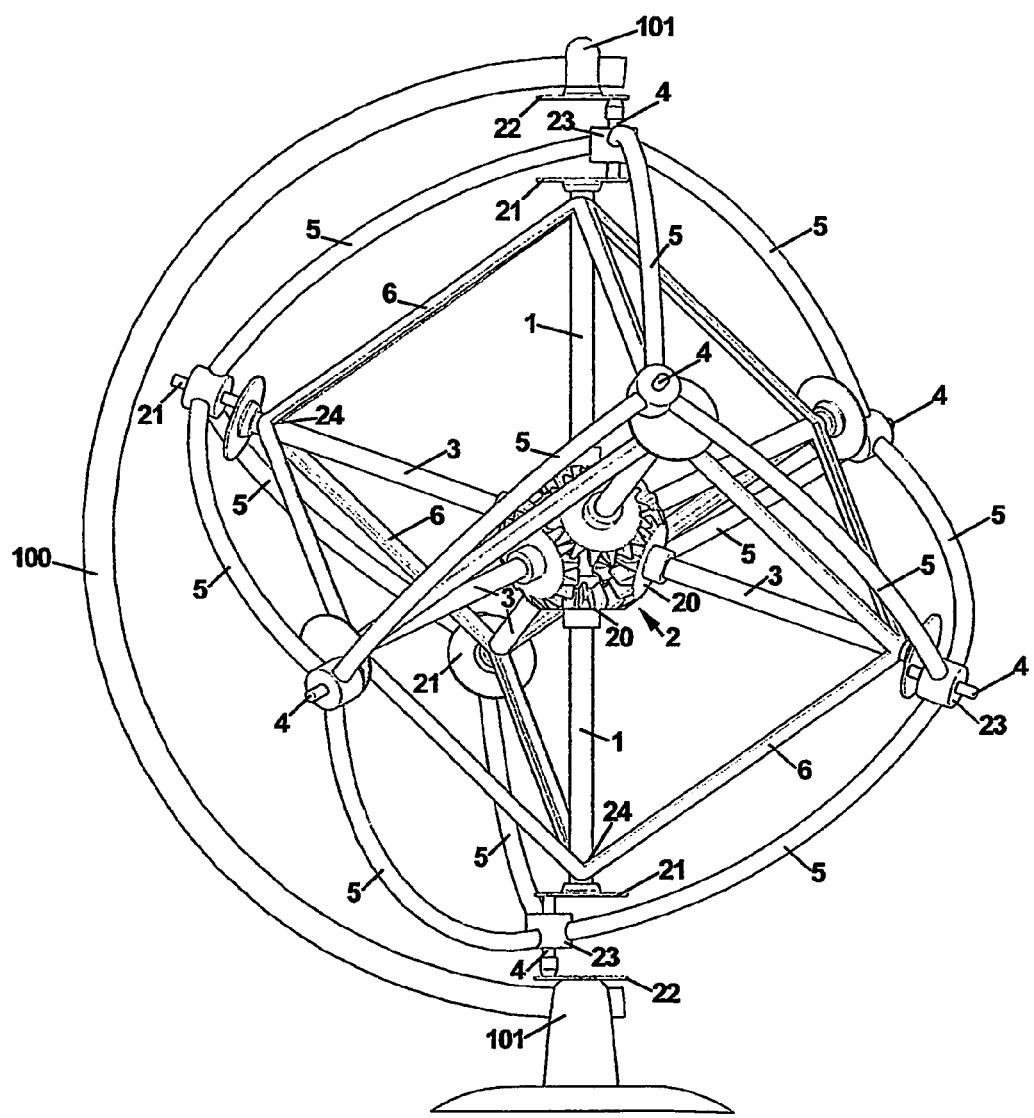
FIG. 6 illustrates a complete first embodiment of the present invention.
Figure 7:
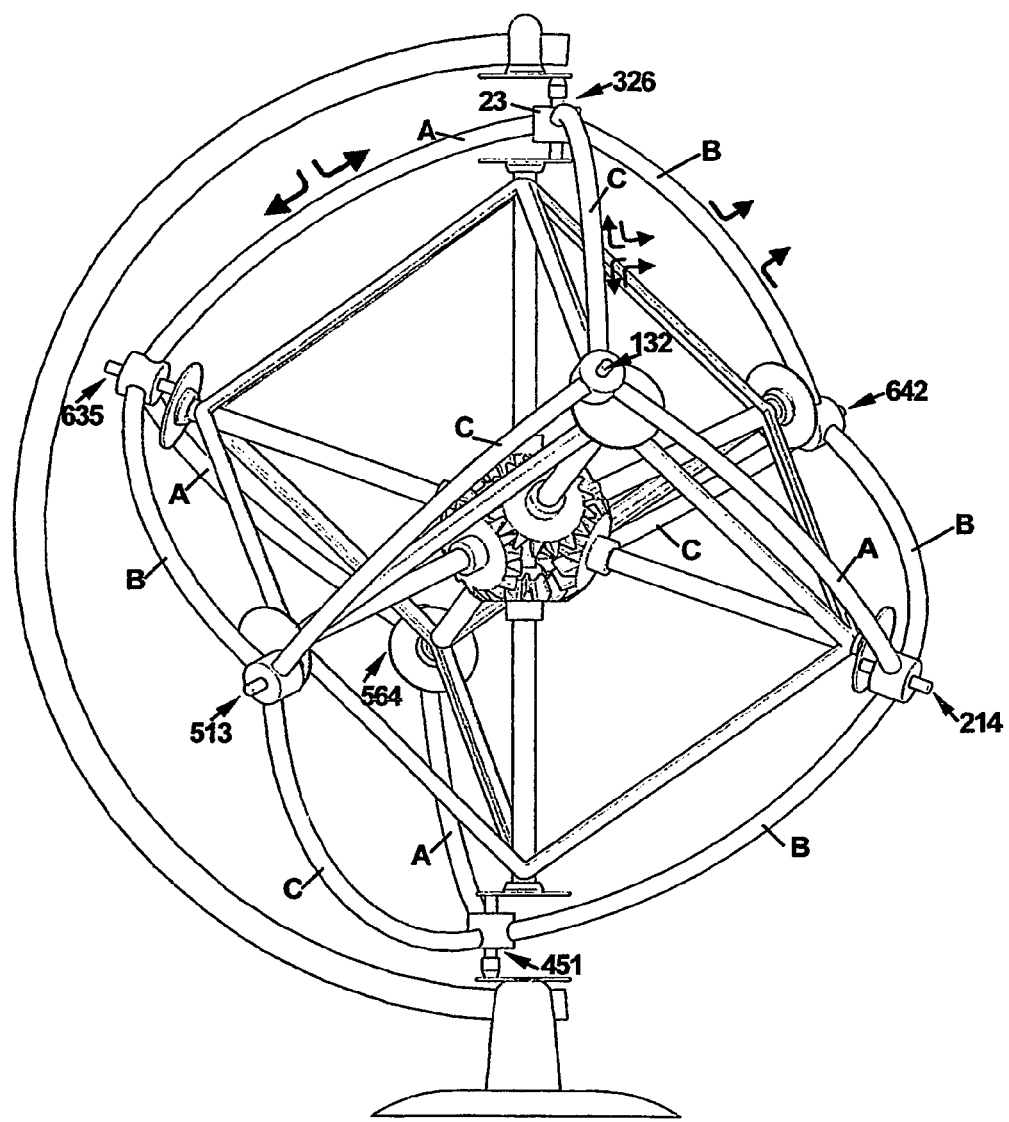
FIG. 7 illustrates the stretching A, contracting B and neutral C loads and cycle moments for the beams placed between and joining neighbor crankpins. Each ring at the crankpins is attached to three beams extending in opposite directions.

In FIG. 7 we can observe that the north and south pins, 326 and 451 experience three different types of loads, stretching A, contracting B and neutral C, represented by the arrows as shown, coming from 3 different directions. The other six pins experience also three loads, but in this case two of those loads are the same type, for example, two neutral and one stretching as at pin 132 or two contracting and one stretching as at pin 214. As said above we can establish many different starting pin positions to determine the initial load of the beam before letting the mechanism turn, but only the particular pin position described in FIG. 6 will produce work.

The initial position of the eight crankpins (4) will allow the beams (5) to rotate the shafts (3) in two different directions, depending on the direction of the initial push. To simplify, we will only describe the rotation where the initial push goes from right to left, with respect to the selected main axle (1) or from East to West, contrary to the rotation direction of the Earth. As said above one third of a revolution of the pins, corresponds to only one of the three moments of the stroke cycle for the entire mechanism. By describing one moment we also describe the other two moments, since for each moment of the cycle the mechanism has four beams (5) in stretching or A configuration (FIG. 11), four beams in contracting or B configuration (FIG. 12) and four beams (5) in neutral or C configuration (FIG. 13). FIG. 10a shows altogether the three groups of four different configuration beams (5) from FIGS. 11, 12 and 13 describing the selected initial moment of load for the twelve beams (5) required for the mechanism to work properly.

After the mechanism rotates one third of a revolution to complete the described first moment of the cycle, each of the beams (5) change configuration due to the fact that the mechanism enters the second moment of the cycle described in FIG. 10b. The order of configuration in which the cycle turns is the following: A, B, C, A, B, C. In other words, the initial phi position should be placed in such a way that after stretching (A) comes contracting (B) and after contracting (B) comes neutral (C), neutral is a combination of stretching and contracting. After neutral (C), the cycle finishes only to start all over again with a stretching (A) movement.

Figure 14B:
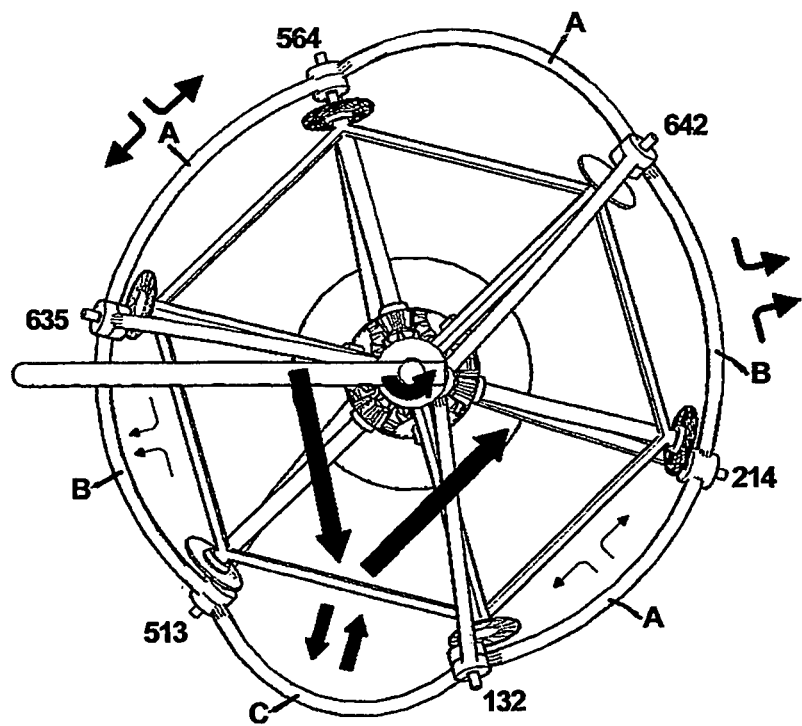
Figure 15B:
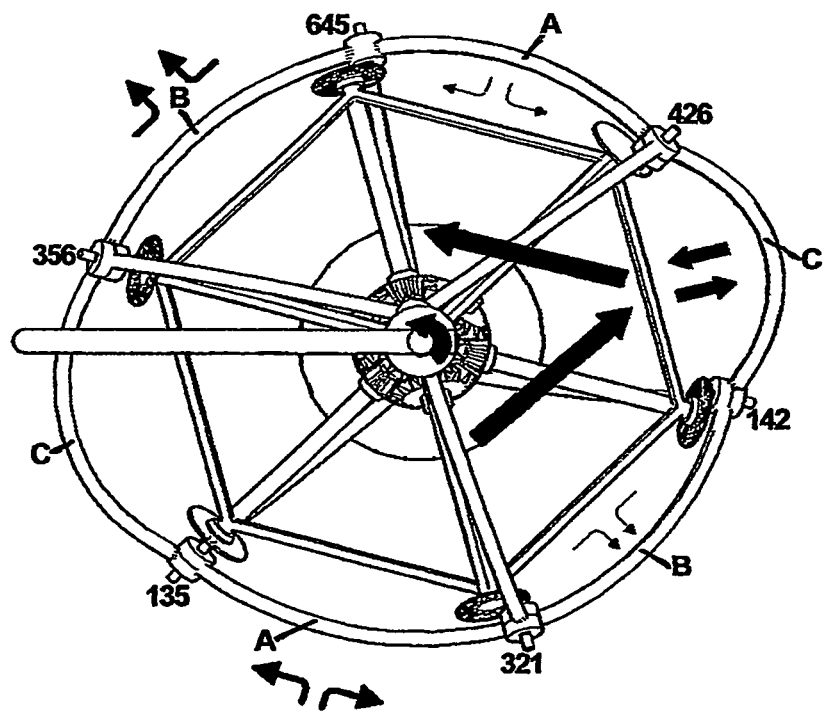
Figure 16B:
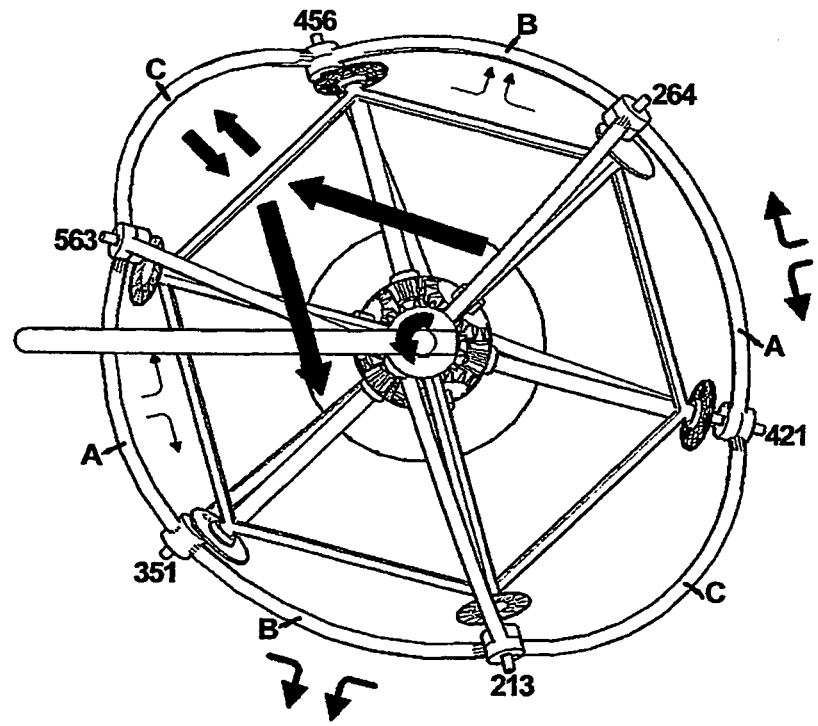

If we want to predict the configuration of the next two moments of FIG. 6, we only need to rotate the figure about the central axle (1), the North-South axis, by 120 degrees to the East or to the right, from the position of FIG. 14a, to place the three A beams spanning pins 263-356-645-514 in front view, describing moment #2 (FIG. 15a) and by rotating another 120 degrees, for a total of 240 degrees, the three B beams spanning pins 632-264-421-145 will position in front view, describing moment #3 of the cycle (FIG. 16a). The cycle starts all over again in moment #1 described in FIG. 14a by a further rotation of 120 degrees so that the three C beams spanning pins 326-132-513-451 are once again at the front. FIGS. 14b, 15b and 16b show the same described moments #1, #2 and #3 in a top view, with the North Pole or pin 326, in front view. In this view we see the mechanism turning counter clockwise, while we go through moments #1, #2 and #3 of the cycle.

In the described Figures, B represents a beam contracting, A represents a stretching beam and C represents the end of the contracting reciprocating movement (7) and the beginning of the stretching reciprocating movement (8), since C includes both directions of movement we represent this moment as neutral. The key for the mechanism to work is to overcome the loads of the initial part of the C moment, the contracting part (7), because once the midpoint or neutral position of this moment is reached, the combined loads of the twelve beams will favor rotation. This means that the loads (7) need to be overcome three times for every revolution of the mechanism, each time in a different section of the mechanism.

To overcome this initial part of the neutral C moment (7) we need the input of other forces like centripetal and coriolis, that are considered pseudo-forces, but necessary to allow for the mechanism to keep turning. If we place the mechanism in one hemisphere we can also use as input the coriolis force of the Earth's rotation, apart from the coriolis force of the mechanism itself. We need to switch the direction of the initial push if the mechanism is located in the other hemisphere. As well as a Foucault pendulum turns with the help of the Earth's rotation we can use this force as an input to keep the mechanism running.

If engineering determines that the Earth's rotation force is not needed to give additional impulse to the mechanism, it might turn out that the gravitational pull of the Earth affects the reactions and balance of the stretching and contracting beams. If this is the case there is a possibility that this mechanism may only work outside the influence of the gravitational pull of the Earth despite this possibility, the mechanism has terrestrial utility as a teaching aid. See FIG. 17. The model can be driven by an input energy rather than producing energy itself. For example, beams (5) may be fabricated from a material which adopts a decreased radius curvature (B) under the influence of current flow yet returns to an increased radius curvature (A) when current flow ceases. By providing a power source, switching means and electrical connection from the power source to the beams through the switching means, each set of four beams can be alternately switched on and off so as to conform to the ABC sequence previously described thereby causing the mechanism to rotate about the axle (1). Alternatively, an input stimulus other than electricity may be used, for example heat, magnetic energy, light, radio frequency, or the like may be used, with the beams being fabricated from appropriate materials responsive to such stimuli. Connecting the axle (1) through the rotational mounts (101) to a take off means will permit the rotation generated by the mechanism to be applied to produce work. In this way provides a practical tool to describe how an energy flow can find a symmetrical path around a spherical body. The mechanism can also be used to explain in a mechanical movement how a spherical body can find its axis of rotation and explain the functioning of coriolis and centrifugal forces.

Figure 11B:
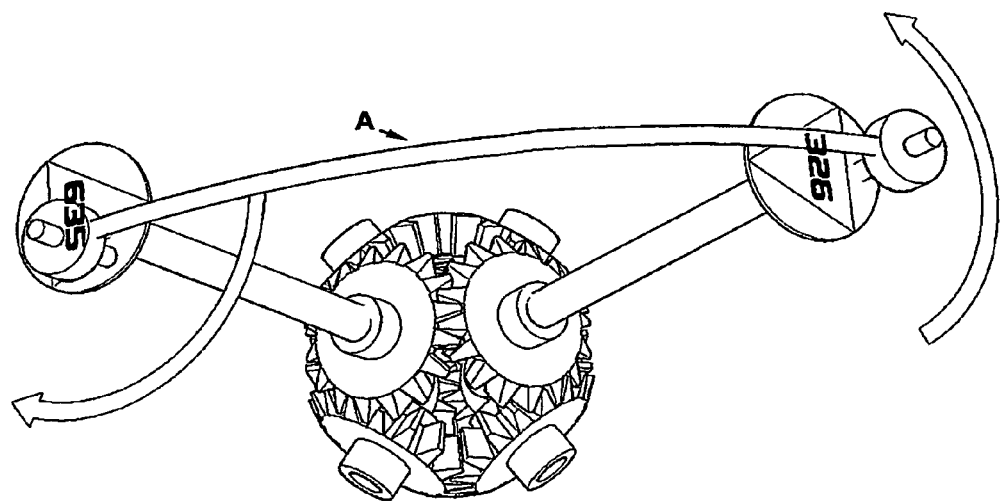
FIG. 11b illustrates a selected beam of the four stretching beams with the involved shafts attached to the octagear. The arrows show the trajectory of the rotation of the shafts that goes from the end of the neutral cycle to the beginning of the contracting cycle.
Figure 11A:
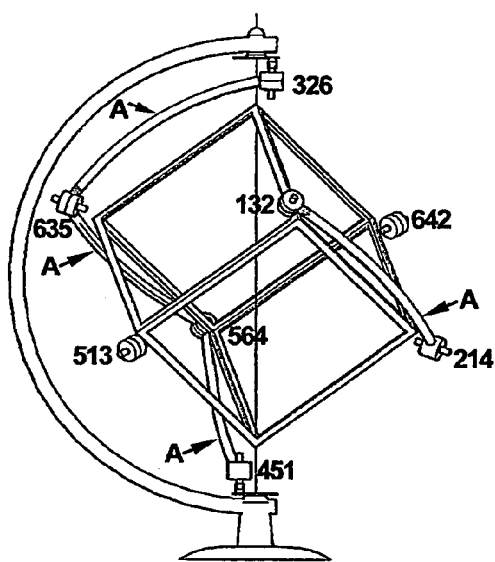
FIG. 11a illustrates a set of four beams with the same loads describing the stretching moment of a spin cycle.
Figure 11C:
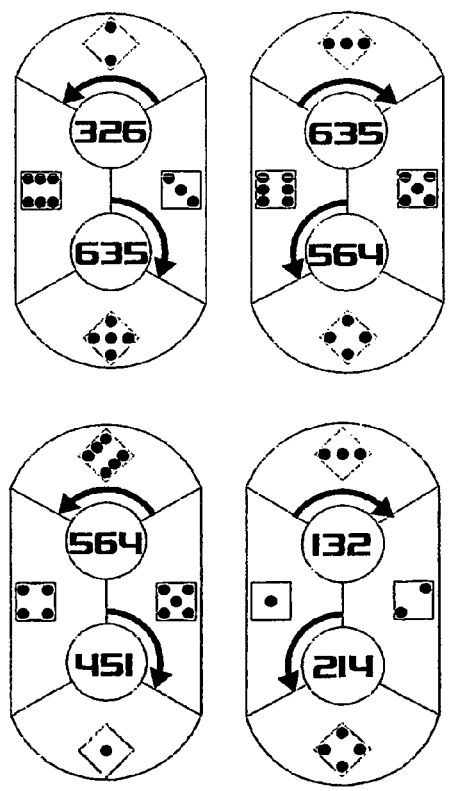
FIG. 11c explains in a two dimensional scheme the three dimensional action and positioning described in FIGS. 11a and 11b. The first scheme of the row is represented in FIG. 11b.

According to descriptions provided above, we find in FIG. 10a the necessary information to determine in a schematic two-dimensional way the starting pin positions and direction for the twelve pins described in FIG. 7 in a three-dimensional way. To further describe the A, B and C moments and corresponding pin positions and directions of rotation, FIG. 10a should be analyzed along with FIGS. 11, 12 and 13. FIG. 11 describes with more detail the upper row of the scheme from FIG. 10a. Accordingly, FIG. 12 describes the middle row of FIG. 10a and FIG. 13 describes the lower row of FIG. 10a. After the mechanism turns the first third of a revolution described in FIG. 10a, the second moment of the cycle is described in FIG. 10b, corresponding to the second third of a revolution and FIG. 10c describes the final moment of the cycle, which corresponds to the last third of a revolution of the mechanism needed to complete a full cycle.

In the preferred embodiment described above, the selected measurements for the key elements of the mechanism are: the beam "beamlength=d+2(d−a)"; the offset radius of the pin "offsetpinlength=a−b"; the shaft from the center of the octagear to the plane of the offset pin "shaftlength=4d/π". Nevertheless other measurements work as well, comprehended within the scope of this application.

All variables depend on the selected size "d" of the apparatus:

$$d = a\sqrt{2}$$

$$4(a-b) = 8\sqrt{2}\, a - (2a + 4b + 4h + 2a\sqrt{2})$$

$$h = \frac{\sqrt{3}}{2} c = \frac{\sqrt{3}}{2} \sqrt{3}\,(d-a) = \frac{3}{2}(d-a)$$

Where "a", "b", "c" and "h" are selected proportions of the selected size "d" of the apparatus. In simple terms these calculations resume in an "offsetpinlength" of about 1% of the "beamlength".

In an alternative embodiment shown in FIG. 18, the mechanism employs the principles of a vibrating string to produce rotation. In this embodiment the beams (5) vibrate between an outer fully contracted position, as seen in FIG. 19a, and an inner fully contracted position, FIG. 22a, returning to the outer fully contracted position. In this process, the beams (5) pass through an outer stretching position, FIG. 20a, and an inner stretching position, FIG. 23a, as well as outer and inner contracting positions, FIGS. 21a and 24a respectively, resulting in a six stroke cycle producing two revolutions per cycle.

To accommodate this string vibration of the beams (5), the mechanism requires a slight modification to the connections of the beams (5) with the shafts (3) and axle (1). Instead of the leverarms or plates (21) and crankpins (4) at the ends, shafts (3) and axle (1) are provided with bent cranks (25) around which the rings or bushings (23) to which the ends of the beams (5) attach are disposed. As in the first embodiment, the rings (23) have an appropriate bearing surface with the cranks (25) to provide low or no friction rotation of the rings (23) relative to the cranks (25) upon alternating contracting and stretching of the beams (5) In addition, the beams (5) attach to the rings (23) by suitable universal-type joints.

As shown in FIG. 18, the location of the cranks (25) is inward from the ends of shafts (3) and axle (1) resulting in the beams (5) being inside the cube frame (6). In this manner, the ends of shafts (3) terminate at bearings (24) at six of the corners of the cube (6). Only the axle (1) passes through its associated cube bearings (24) to the rotational mounts (101) on frame (100).

If needed for additional structural rigidity of the mechanism, a second smaller cube frame (26) may be provided around the octagear (2), the corners of the smaller cube frame (26) being low or no friction sleeve bearings or bushings (27) through which shafts (3) and axle (1) pass. Although only shown in connection with the second embodiment of FIG. 18, this second smaller cube frame (26) may also be applied to the mechanism of the first embodiment of FIG. 6. As a further alternative, the bevel gears (20) may be supported by an internal frame or sphere, as indicated previously, so as to be rotatable thereon.

As noted previously with the beams (5) attached at the ends of shafts (3), the mechanism of the first embodiment requires that beams (5) maintain a minimal radius of curvature in the stretched position. If the beams (5) of the first embodiment adopt a straight line in the stretched position, the mechanism will lock.

In contrast, the vibrating beams (5) of the second embodiment pass through a straight line position from the outer contracted position to the inner contracted position and return. This results in the six stroke cycle shown in FIGS. 19-24. Following the convention established previously and considering the fully contracted positions of FIGS. 19a and 22a equivalent to the neutral position of the beams (5) of the first embodiment, the sequence of operation illustrated in FIGS. 19-24 is fully outer contracted or neutral, C, outer stretching, A, inner contracting, B, fully inner contracted, C, inner stretching, A, and outer contracting, B. Thus, the order of configuration for the beams (5) of the second embodiment becomes C, A, B, C, A, B, producing rotation moments as shown in FIGS. 19b-24b. FIGS. 21b, 22b and 23b represent inner contracting, neutral and stretching moments and are designated by the dot at the end of the arrows signifying the direction of rotation. Each moment or stroke produces 120 degrees of rotation conveyed to axle (1) through octagear (2). Thus, the first three strokes, C, A, B, from fully outer contracted to inner contracting as shown in FIGS. 19a-21a, results in one complete revolution of the mechanism. Similarly, the return strokes, C, A, B, from fully inner contracted to outer contracting as shown in FIGS. 22a-24a, produce a second complete revolution such that one complete cycle of six strokes produces two complete revolutions of the mechanism. The balance of this cycle between inner and outer stretching and contracting is important to provide the extra push needed to create output.

Although slightly different in structure, the overall operation and rotational characteristics of the mechanisms of the first and second embodiments are substantially identical.

In FIGS. 25a, b and c the numbered triangles correspond to the crank mechanisms, i.e., crankpin (4) or crank (25) positions relative to the faces of the cube (6) as previously explained and the lines between triangles describe the corresponding beams. The arrows show the direction in which the crank mechanism is turning. These arrows have to turn around the triangles six times, or two revolutions to complete 1 cycle. FIG. 25a shows a set of three particular beams (5) contracting, B, and FIG. 25c shows another set of three particular beams (5) stretching, A. In FIG. 25b a third set of three bars in contracted or neutral, C, position, with the particular characteristic that all the crank mechanisms represented by arrows are moving in the same direction. This "opening" or "clear way" that appears every time the aligned group is in the neutral or C moment, promotes frictionless rotation to that sector of the mechanism at that particular point in time. At every one of the six moments of the cycle, there is a contracted or neutral C group of beams (5) aligned in a sector of the mechanism taking advantage of the described alignment.

Moreover, the mechanism shows at every moment of the cycle three groups of three aligned bars, each group extending in zigzag from pole to pole, occupying an opposed sector of the mechanism, each sector going through an opposed stretching/contracting moment of the cycle, which in turn adds symmetry, balance and combined efforts between groups of beams to promote the cycle. Thereby we know that the stages or strokes of a cycle always go in the order of contracting/contracted/stretching (B/C/A), opposed to the other option B/A/C. This particular order comes from the restrictions that we set on the way the crank mechanisms move, via the initial position of the crank mechanisms around the mechanism. Also each group of aligned beams (5) accommodate in three opposed directions from the poles down, in the same particular order: B/C/A, coinciding with the direction of the rotation of the mechanism. As in FIGS. 10a, b and c, FIGS. 30a-d, 31a-d and 32a-d show the three groups of four configuration beams (5) of the second embodiment describing the selected initial moment of load for the twelve beams (5) required for proper operation of the mechanism. Because the beams (5) of the second embodiment exhibit both inward and outward motion, the point of inward motion is indicated by a dot at the end of the arrows signifying the direction of rotation for the particular shaft.

This symmetry makes it simple to predict the next stage of any group of three aligned beams. As an example, by looking at the position of the arrows of FIG. 25c one can easily deduce that they correspond to the next cycle of the arrows of FIG. 25b. In the same way, FIG. 25a. corresponds to the next moment of FIG. 25c. Notice that if we were describing three consecutive moments of a group of aligned beams (5), FIGS. 25a, b and c would need to show the same numbers inside the triangles in each Figure. As they are, FIGS. 25a, b and c describe one single stroke moment in time, the initial one, of the nine beams (5) that align in three groups distributed in opposed sectors of the mechanism. As a general rule in predicting the next moment of a particular group of aligned beams (5), we know that the future stage of an aligned group is the present stage of the aligned group to the left or west (this is to the direction of the turn, because in our case the rotation is East-to-West). The alternate option would be that they align in order: B/A/C.

The importance of this conclusion is that by these aligned groups accommodating in the described order the balance of the beams in the second embodiment favors rotation because although the relation between aligned groups is one of increasing contraction in counter direction to the rotation, since at stroke #1 the aligned group of beams in the right of the fully contracted group of beams shows increasing contraction in stroke #2, that contraction is of the inner type, favoring the balance to the left, where the single beam in stroke #2 is showing outward increasing contraction also favoring the balance to the left.

The cycle of the mechanism continues to show its symmetry when the three single equatorial beams (5) placed between the three groups of aligned beams (5) exhibit stroke moments opposed from the moments of the groups. For example, between a pole-to-pole B aligned group on the East of the mechanism and a similar C aligned group on West side, we find a single equatorial beam (5) exhibiting a stretching moment (A). FIGS. 26a, b and c show the relationship between aligned groups and single beams (5). Note in the figures, that six beams (5) form the equatorial sector of the mechanism, the left and right triangle have the same number since six beams (5) form a circle (for this reason these triangles are partially represented in dotted lines. FIG. 26a describes a first moment, from right to left: contracted (C)/stretching (A)/contracting (B)/contracted (C)/stretching (A)/contracting (B)/. FIG. 26b describes a second moment, from left to right: (A)/(B)/(C)/(A)/(B)/(C). FIG. 26c describes a third moment: (B)/(C)/(A)/(B)/(C)/(A). Note in FIGS. 26a, b and c by the number inside the triangles that three of the beams (5) correspond with beams (5) in FIGS. 25a, b and c, those beams (5) being part of the aligned group of beams (5), the rest of the beams (5) being the single beams (5). In conclusion we can affirm that the symmetry of the mechanism runs aligned along the latitude and runs alternated along the longitude of the mechanism.

This symmetry results in a synchronized cooperation of the beams (5) that in a top view exhibit at every one of the six moments of the cycle half a sphere in inside position and the other half in outside position as shown in FIGS. 27a-f. These figures follow the bending moments of beams (5) through a complete six stroke cycle of the mechanism viewed from a polar position and progressing in a clockwise or East-to-West direction.

This symmetry results in a wave-like motion around the mechanism which causes the center of mass to similarly move in a wave around the mechanism. It is believed that this wave-like oscillation of the center of mass adds to the initial input of force into the mechanism and, thereby, promotes continued rotation beyond that point where friction would ordinarily overcome momentum and bring the operation to a halt. Theoretically, if all friction could be removed, the oscillation of the center of mass around the mechanism could provide sufficient input to maintain operation of the mechanism indefinitely. However, such indefinite operation is neither contemplated nor sought by the present application.

The movement of the center of mass serves as an additional force input to that initially applied to start the mechanism and to overcome the load of the beams (5) and permit the mechanism to progress through the strokes of the cycle of operation.

Assigning one unit of pressure to every degree that the mechanism turns, helps in visualizing that due to the symmetry of the initial selected position of the beams, the cycle will show peaks and valleys when combining the loads of the twelve beams.

A fully contracted (C) beam carries more load than a straight one. Assigning 180 units of load to the (C) beam position, when the crankpins (4) or cranks (25) holding a (C) beam turn 180 degrees or half a revolution, the beam adopts a straight position (S) that carries no load so zero units of load are assigned for the (S) position. The graphs of FIGS. 28 and 29 represent the load forces on the beams during a six stroke cycle of the mechanism and the dotted line represents the zero load or (S) position. The y-axis represents load quantity between zero and 180 units of load and the x-axis represents time, divided in 6 strokes (6 strokes=2 revolutions=1 cycle). Between each stroke we find intermediate 0.5 positions, from now on (½x). We name full positions as (x).

Adding the combined loads of the beams at different points in time we can determine that the load rises at the (x) positions and drops at the (½x) positions. For example, in FIG. 28, stroke 1 has a combined load of 60+60+180=300 and stroke 1.5 has a combined load of 120+120+0=240. Each cycle goes 3 times through a peak and 3 times through a valley.

Assuming that the beams have a perfect elasticity we can conclude that the mechanism will eventually stop due to friction and other forces at a (½x) position. Now when the mechanism is in an (x) position load needs to be relieved towards the (½x) position. But when it reaches (½x) it will continue its rotation due to the impulse. In a frictionless world that impulse would bring the mechanism back to the next (x) position in another section of the apparatus.

Following the same above example: FIG. 28 represents in A the cycle and load moment of the three aligned fully contracted or neutral (A) beams, B represents the three aligned contracting or (B) beams and C represents the three aligned stretching or (C) beams. FIG. 29 represents in A the cycle and load moment of a single equatorial stretching or (A) beam, B represents a single equatorial contracting or (B) beam and C represents a single equatorial contracted or neutral (C) beam. When we add the loads in FIG. 28 three times (3×(180+60+60)=900) and the loads in FIG. 29 one time (1×(180+60+60)=300), our example results in a total load of 1200 units for (x) positions and 960 (4×(0+120+120)=960) units for (½x) positions. So the total (x) load less the total (½x) load equals 1200−960=240 units.

Figure 27A:
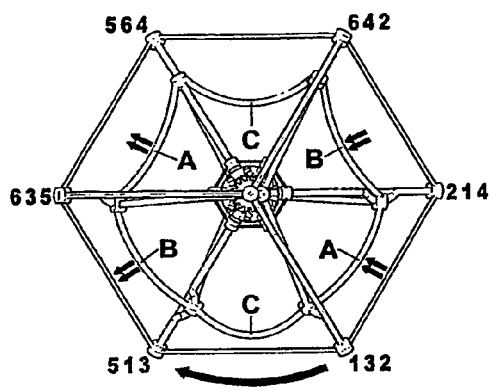
Figure 27B:
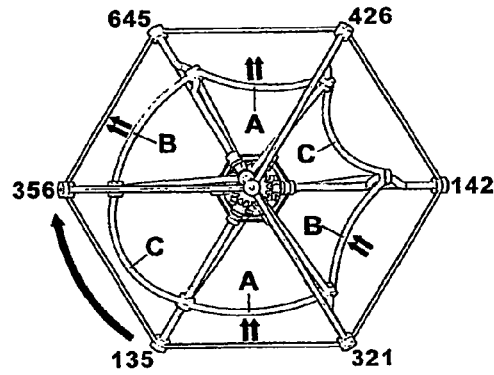
Figure 27C:
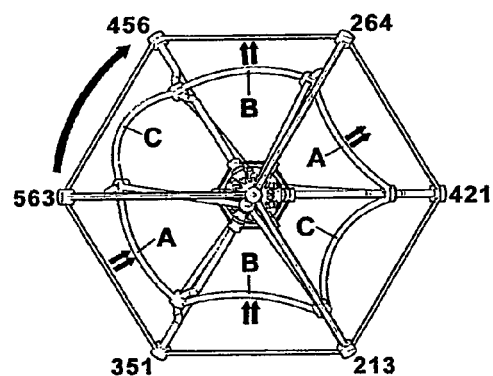
Figure 27D:
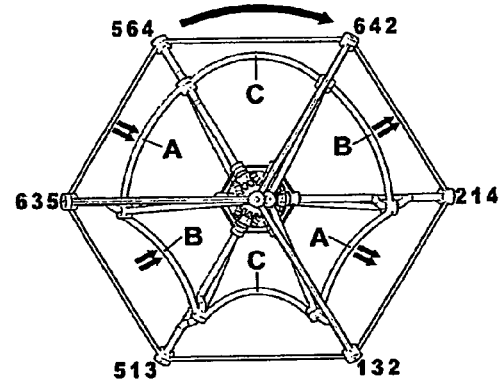
Figure 27E:
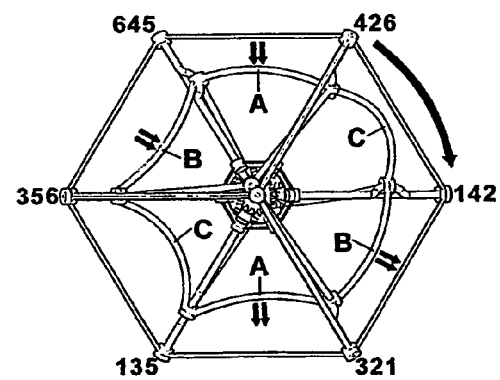
Figure 27F:
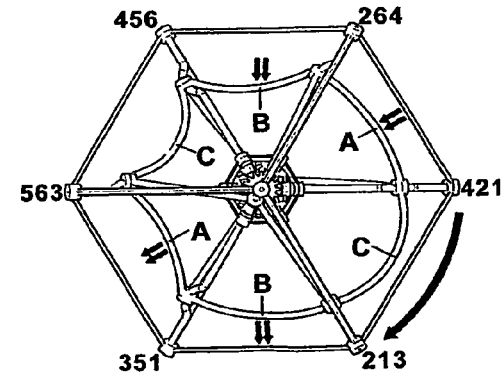

The mechanism needs to overcome a load of 240 (20% of total maximum load) units to be able to reach the next stroke. Impulse itself will help a lot, engineering can produce acceleration at the straight-line position (S), but we can also count on the center of mass movement as an additional force. If we imagine the mechanism as a spinning figure skater, when she pulls her hands close to the rotation axis the rotation rate increases, in turn when she straightens her arms out the rate reduces. FIG. 27a-f shows in a top view the position of the beams at each stroke. FIG. 27a describes stroke 1 and FIG. 27f describes stroke 6. The arrows at each figure show the direction of rotation and the section of the hexagon where the center of mass locates at each stroke. Following the example of the skater, for every stroke of the mechanism six beams in one section of the apparatus are in the outer phase of fully contracted, contracting or stretching, equivalent to the skater's arms moving outward, and the other six beams are in the inner phase of fully contracted, contracting or stretching and, like the faster spinning skater, have their mass closer to the rotational axis on the opposite section of the apparatus.

The position and not the force of the vibrating beams is what results in this oscillation of the center of mass relative to the rotational axis in the right time for each stroke thereby adding force to overcome the 240 units of load to reach the next stroke moment.

It is important to note in FIG. 27 that the sequence (27a-f) describes a top view of a mechanism that is not rotating. The six three digit numbers, describing the pin location at the vertices of the apparent hexagon correspond to the visible corners of cube frame (6) and are fixed in space throughout the sequence (a-f). The three digit configuration on the numbers varies but the pins are always the same. For example in FIG. 27a the bottom right number is 132, in FIG. 27b that same location shows 321 and FIG. 27c shows 213. As described before the lever arm located in the corner of the die where 1, 2 and 3 meet, can be described as 132, 321 or 213 because the numbers tells us about the shaft location and the order tells us about the direction and pin position. The six strokes described in the sequence (a-f) show similar number configuration for the first (a-c) and second (d-f) revolutions, only that the beam positions are different.

If we run in a video a couple of cycles (27a-f) one after the other, it appears as if the mechanism is rotating clockwise, but we know from the above description that at this moment the mechanism is fixed in space (only the central axle (1) is rotating counterclockwise). The illusion of rotation means that the individual masses of each beam are not only doing work by rotating the lever arms, but more important, each individual beam is also working in coordination with the rest of the beams pushing the center of mass around the central axle (1) once for every cycle. The result is that the twelve beams adopt the previous position 60 degrees to the right. The beams are not adopting a lean because of the centrifugal force of the rotation, the amazing result is that the beams are predicting or suggesting a rotation. When the sequence is seen from other points of view the motion across the mechanism appears to be random. But when viewed from above the north pole, it appears like the mechanism changes its form—stroke by stroke—to create an invisible lever arm that is offset relative to the axis of rotation that pushes the whole body of the mechanism clockwise. Such behavior is not expected.

What this means is that if we invert the forces and we now fix the rotating axle to the ground and allow free rotation of the mechanism, the individual beams will do their part in stretching and contracting resulting in a synergy which creates an orderly movement of the center of mass across the mechanism and gives the mechanism an "additional" extra push towards rotation, at this moment is when the pseudo forces appear. We are in front of a very special case: a self-organization that induces unexpected energy to the cycle. This sudden coherence in what should only be random fluctuation of the beams teachings of this mechanism. We believe this coherence is driven by gravity, created by the impossibility of the octacore to penetrate its own core.

The idea is to bring the mechanism so close to equilibrium, that a minor added impulse, such as the inherent motion of the mechanism or the coriolis or centrifugal force from other bodies acting on it, like the rotation of the Earth, will add the needed input to overcome each stroke and propel the mechanism to the next moment in the cycle.

Although, in theory, coriolis and centrifugal forces will have an effect on any size mechanism, in practical terms the apparatus would have to be of a large size to conclusively demonstrate such effect. However, in smaller size models we can use the mechanism as teaching aid to show an example of a mechanism that comes very close to equilibrium, to demonstrate the theory that pseudo forces like coriolis or centrifugal can have on spinning objects.

While the invention has been described with respect to certain specific embodiments, it will be appreciated that many modifications and changes may be made by those skilled in the art without departing from the spirit of the invention. It is intended, therefore, that all such modifications and changes are within the true spirit and scope of the invention as recited in the following claims.

The invention claimed is:

1. A teaching apparatus comprising a support frame holding a rotatable mechanism comprising:
   an octagear having eight engaging bevel gears,
   eight elongated shaft members, each extending outward from one bevel gear and rotatable about a longitudinal axis thereof,
   a crank mechanism disposed at an outer end of each shaft member,
   twelve beams rotatably connected to said crank mechanisms, each beam spanning between two different crank mechanisms and each beam capable of oscillating between a first curved position and a second curved position,
   whereby said oscillation of said beams is translated to said shaft members through said crank mechanisms causing rotation of said shaft members along their longitudinal axes and concurrent rotation of said bevel gears whereby said mechanism is caused to rotate within said support frame.

2. The apparatus of claim 1 further comprising frame members disposed inward of said beams, said frame members forming a cube, wherein each of said shaft members passes through a corner of said cube frame, said corners having bearing means disposed therein.

3. The apparatus of claim 2 wherein said crank mechanisms comprising crank bearing means rotatably connected to said shaft members and offset relative to the longitudinal axes of said shaft members, and universal joint means whereby said beams are connected to said crank bearing means, whereby oscillation of said beams is translated to said crank mechanisms and said crank mechanisms convert said oscillation to rotary motion of said shaft members.

4. The apparatus of claim 3 wherein said beams have a maximum curvature and a minimum curvature and are capable of alternating between said maximum and minimum curvature in a sequence and order whereby the effective length of said beams changes thereby generating reciprocation in a continuous manner which reciprocation is converted by the crank mechanisms into rotation of the shaft members and, through the octagear, into rotation of the mechanism within the support frame.

5. The apparatus of claim 4 further comprising a take off means and wherein said mechanism is fixed in said support frame along a primary axis corresponding to two longitudinally opposed elongated shaft members associated with said take off means whereby rotation of said two opposed elongated shaft members generated by reciprocation of said beams is transmitted to said take off means.

6. The apparatus of claim 4 wherein said beams are responsive to an input stimulus to alternate between said maximum and minimum curvature, said apparatus further comprising means to provide said input stimulus in a manner to cause said alternation of said beams thereby generating reciprocation.

7. The apparatus of claim 6 wherein said stimulus is selected from the group consisting of electricity, heat, magnetic energy, radio frequency and light.

8. The apparatus of claim 7 further comprising control means for said stimulus to control application thereof to said beams.

9. The apparatus of claim 1 further comprising frame members disposed at the outer ends of said shaft members, said frame members forming a cube, wherein each corner of said cube is provided with a bearing member in which the end of one shaft member is received.

10. The apparatus of claim 9 wherein said crank mechanisms comprise offset portions of said shaft members inward of said cube frame, said offset portions having bearing means rotatably disposed thereabout, said bearing means having universal joint means whereby said beams are connected to said bearing means, whereby oscillation of said beams is translated to said crank mechanisms and said crank mechanisms convert said oscillation to rotary motion of said shaft members.

11. The apparatus of claim 10 wherein said beams have a maximum outer curvature in a direction away from said octagear and a maximum inner curvature toward said octagear and are capable of alternating between said maximum inner and maximum outer curvature in a sequence and order whereby the effective length of said beams changes thereby generating reciprocation in a continuous manner which reciprocation is converted by the crank mechanisms into rotation of the shaft members and, through the octagear, into rotation of the mechanism within the support frame.

12. The apparatus of claim 11 further comprising a take off means and wherein said mechanism is fixed in said support frame along a primary axis corresponding to two longitudinally opposed elongated shaft members associated with said take off means whereby rotation of said two opposed elongated shaft members generated by reciprocation of said beams is transmitted to said take off means.

13. The apparatus of claim 11 wherein said beams are responsive to an input stimulus to alternate between said maximum and minimum curvature, said apparatus further comprising means to provide said input stimulus in a manner to cause said alternation of said beams thereby generating reciprocation.

14. The apparatus of claim 13 wherein said stimulus is selected from the group consisting of electricity, heat, magnetic energy, radio frequency and light.

15. The apparatus of claim 14 further comprising control means for said stimulus to control application thereof to said beams.

* * * * *